(12) United States Patent
Husain et al.

(10) Patent No.: US 7,328,261 B2
(45) Date of Patent: Feb. 5, 2008

(54) DISTRIBUTED RESOURCE MANAGER

(75) Inventors: Syed Mohammad Amir Husain, Austin, TX (US); Todd John Enright, Austin, TX (US); Barry W. Thornton, Austin, TX (US)

(73) Assignee: ClearCube Technology, Inc., Austin, TX (US)

( * ) Notice: Subject to any disclaimer, the term of this patent is extended or adjusted under 35 U.S.C. 154(b) by 781 days.

(21) Appl. No.: 10/301,518

(22) Filed: Nov. 21, 2002

(65) Prior Publication Data

US 2003/0126260 A1   Jul. 3, 2003

Related U.S. Application Data

(60) Provisional application No. 60/411,066, filed on Sep. 16, 2002, provisional application No. 60/332,143, filed on Nov. 21, 2001.

(51) Int. Cl.
*G06F 15/173* (2006.01)

(52) U.S. Cl. ........................................ 709/224

(58) Field of Classification Search ........ 709/224–226, 709/223
See application file for complete search history.

(56) References Cited

U.S. PATENT DOCUMENTS

| | | | |
|---|---|---|---|
| 3,725,866 A | 4/1973 | Oldfield et al. |
| 4,484,306 A | 11/1984 | Kulczyckyj et al. |
| 4,688,246 A | 8/1987 | Eilers et al. |
| 4,885,718 A | 12/1989 | Asprey et al. |
| 5,150,243 A | 9/1992 | Suzuki |
| 5,257,390 A | 10/1993 | Asprey |
| 5,263,158 A | 11/1993 | Janis |
| 5,268,676 A | 12/1993 | Asprey et al. |
| 5,337,413 A | 8/1994 | Lui et al. |
| 5,347,167 A | 9/1994 | Singh |
| 5,353,409 A | 10/1994 | Asprey et al. |
| 5,428,806 A | 6/1995 | Pocrass |
| 5,479,617 A | 12/1995 | Nei |
| 5,499,377 A | 3/1996 | Lee |
| 5,550,593 A | 8/1996 | Nakabayashi |
| 5,577,205 A | 11/1996 | Hwang et al. |
| 5,598,401 A | 1/1997 | Blackwell et al. |
| 5,623,304 A | 4/1997 | Ota et al. |
| 5,675,811 A | 10/1997 | Broedner et al. |
| 5,715,410 A | 2/1998 | Kim |

(Continued)

Primary Examiner—Jason Cardone
Assistant Examiner—Minh-Chau Nguyen
(74) Attorney, Agent, or Firm—Meyertons Hood Kivlin Kowert & Goetzel, P.C.; Jeffrey C. Hood; Mark S. Williams

(57) ABSTRACT

A distributed resource manager for managing resources among a plurality of networked computers, e.g., computer blades. The resource manager executes on two or more of the computers, e.g., substantially concurrently, collecting data related to usage, performance, status, and/or load, for a component, process, and/or attribute of one or more computers, and evaluating operation rules based on the collected data to determine one or more resource management operations, e.g., re-configuring, activating/deactivating, and/or switching and/or swapping computers, for more efficient allocation of resources. Each executing resource manager transmits the determined resource management operations to the other executing resource managers, receives respective determined resource management operations from them, and resolves conflicts between the determined resource management operations and the received respective determined resource management operations, thereby generating a modified one or more resource management operations. The modified resource management operations may be performed with or without human input.

36 Claims, 12 Drawing Sheets

U.S. PATENT DOCUMENTS

| | | | |
|---|---|---|---|
| 5,721,842 A | 2/1998 | Beasley et al. | |
| 5,734,834 A | 3/1998 | Yoneyama | |
| 5,764,924 A | 6/1998 | Hong | |
| 5,781,747 A | 7/1998 | Smith et al. | |
| 5,801,689 A | 9/1998 | Huntsman | |
| 5,802,281 A | 9/1998 | Clapp et al. | |
| 5,826,082 A * | 10/1998 | Bishop et al. | 718/104 |
| 5,826,239 A * | 10/1998 | Du et al. | 705/8 |
| 5,831,608 A | 11/1998 | Janey et al. | |
| 5,878,271 A | 3/1999 | Crump et al. | |
| 5,884,096 A | 3/1999 | Beasley et al. | |
| 5,926,172 A | 7/1999 | Hanley | |
| 5,926,509 A | 7/1999 | Stewart et al. | |
| 5,948,092 A | 9/1999 | Crump et al. | |
| 5,966,056 A | 10/1999 | Thornton | |
| 6,006,256 A | 12/1999 | Zdepski et al. | |
| 6,012,101 A | 1/2000 | Heller et al. | |
| 6,038,616 A | 3/2000 | Heller et al. | |
| 6,070,214 A | 5/2000 | Ahern | |
| 6,078,974 A | 6/2000 | Kirshtein | |
| 6,081,826 A * | 6/2000 | Masuoka et al. | 718/100 |
| 6,112,243 A * | 8/2000 | Downs et al. | 709/226 |
| 6,112,311 A | 8/2000 | Beardsley et al. | |
| 6,119,146 A | 9/2000 | Heller et al. | |
| 6,185,643 B1 | 2/2001 | Kirshtein et al. | |
| 6,225,984 B1 | 5/2001 | Crawford | |
| 6,381,666 B1 | 4/2002 | Kejser et al. | |
| 6,418,504 B2 | 7/2002 | Conway et al. | |
| 6,430,611 B1 * | 8/2002 | Kita et al. | 709/223 |
| 6,836,800 B1 * | 12/2004 | Sweet et al. | 709/224 |
| 7,111,297 B1 * | 9/2006 | Sankaranarayan et al. | 718/104 |
| 2002/0062376 A1 * | 5/2002 | Isoyama | 709/226 |
| 2003/0028642 A1 * | 2/2003 | Agarwal et al. | 709/226 |
| 2003/0033409 A1 * | 2/2003 | King et al. | 709/225 |
| 2003/0055969 A1 * | 3/2003 | Begun et al. | 709/226 |

* cited by examiner

DISTRIBUTED RESOURCE MANAGER

PRIORITY CLAIM

This application claims benefit of priority of provisional application Ser. No. 60/332,143 titled "A Fail Forward Networked Storage System" filed on Nov. 21, 2001, whose inventor is Barry Thornton.

This application also claims benefit of priority of provisional application Ser. No. 60/411,066 titled "Distributed Computing Infrastructure" filed on Sep. 16, 2002, whose inventors are Amir Husain, Todd Enright, and Barry Thornton.

BACKGROUND OF THE INVENTION

1. Field of the Invention

The present invention relates generally to computer systems, and specifically to a distributed resource manager.

2. Description of the Related Art

Many commercial businesses and enterprises make extensive use of personal computers (PCs) in their daily operations. Typically, each user of a PC in the enterprise has a networked PC at his/her desk or work area. As the number of networked computer systems utilized in an enterprise increases, the management of resources in the network may become increasingly complex and expensive. Some of the manageability issues involved in maintaining a large number of networked computer systems may include ease of installation and deployment, the topology and physical logistics of the network, asset management, scalability (the cost and effort involved in increasing the number of units), troubleshooting network or unit problems, support costs, software tracking and management, as well as the simple issue of physical space, be it floor space or room on the desktop, as well as security issues regarding physical assets, information protection, software control, and computer virus issues.

Many of these issues may be addressed by centralizing the locations of the PCs, such as by installing multiple PCs into a central frame or cabinet, and locating each PC's human interface (e.g., keyboard, monitor, mouse, etc.) at a respective remote location, e.g., more than 10 or 20 feet from the computing system. In one approach, each computer in the system may be a "computer on a card", also referred to as a computer blade or "blade". In other words, the computing system may be comprised on a circuit card that may include standard computing system components such as a CPU, memory, power supply, and network interface, as well as an extender, e.g., a USB or PCI extender, for communicating with the remote human interface.

In networked systems where a plurality of human interfaces are each coupled to any of a plurality of computers, resource management is typically handled by a system administrator. For example, the system administrator may use various monitoring and auditing tools to determine where problems or potential problems may occur, or may simply survey the users of the computers periodically to determine any performance issues that may arise.

However, these prior art approaches to resource management tend to be time consuming and prone to error. For example, users may not provide reliable information as to their needs and workstation performance levels. Additionally, system performance audits and analyses may be difficult to schedule and/or perform, depending on the demands upon the system administrator and/or the work schedules of users.

Therefore, improved systems and methods for managing resources in a system of networked computers are desired.

SUMMARY OF THE INVENTION

Various systems and methods are presented for operating a distributed resource manager on a computer system. In one embodiment, the computer system may comprise a plurality of computers, each having a processor and a memory medium, i.e., a storage medium. The network of computers may store and execute a distributed resource manager to collect data related to computers in the network and analyze the collected data to determine one or more resource management operations. Data may be collected relative to one or more of usage, performance, status, and load, for a component, process, and/or attribute of one or more computers. In one embodiment, the data may relate to one or more of a total memory size, a used memory size, a virtual memory size, peripheral type, available ports, processor type, processor speed, type of installed applications, whether a user is logged in, frequency of logins, a processor, a hard disk, network hardware installed, network usage and/or status, usage and/or status of installed applications, video specifications, a CD-ROM, a parameter stored in an inventory database, geographical information, a parameter exported by an operating system, and a parameter exported by a BIOS (Basic I/O Service), among others.

In one embodiment, the data may be collected by a collector agent executing on each of the one or more computers. In one embodiment, after collecting the data, e.g., from the computer on which the agent is executing, the collector agent may send the data to a central database. In another embodiment, the database may be distributed over a subset of the one or more computers. The collector agent may send the data to the database periodically, substantially continuously, may have scheduled times to send the data, and/or may send the data in response to a query from one or more computers. In one embodiment, one or more computers may query one or more other computers for the data. Each of the one or more computers may send queried data in response to said query, and may each also collect respective queried data. Other methods of collecting data are also contemplated.

In one embodiment, one or more operation rules may be evaluated using collected data to determine if one or more resource management operations should be performed for the plurality of computers, e.g., for one or more of the plurality of computers. Each operation rule may specify one or more conditions for a resource management operation. In evaluating each operation rule, an operation indicator value may be calculated to indicate a strength of the conditions for the resource management operation. The calculated indicator values for the operation rules may be analyzed to determine a resultant indicator value for the resource management operation. In one embodiment, calculating the resultant indicator value may involve computing a weighted sum of the calculated indicator values by adding together each indicator value after each indicator value is weighted by a respective weighting coefficient. Other methods of determining resultant indicator values may include, but are not limited to, a Bayesian decision-making network, predicate logic, fuzzy logic, an averaging technique, a percentage majorities technique, an at least one technique, and an at least none technique, among others.

The resource management operations for one or more of the computers may include, but are not limited to, a single computer switch, a computer swap, a cascading move, a configuration, a backup of a storage medium, an activation or deactivation, a storage operation, an execution or termination of a program, and a transmission of a message related to usage, performance, status, and load, for a component, process, and/or attribute of the one or more computers. Other resource management operations are also contemplated. In one embodiment, resource management operations may be performed automatically, i.e., without human input. In another embodiment, the resource manager may indicate one or more resource management operations to a human and perform the one or more resource management operations after receiving input from the human initiating the one or more resource management operations. Other scheduling methods are also contemplated.

Because the resource manager may be distributed, the decisions of each computer may be broadcast to each of the other computers in the network. If various decisions from various computers are in conflict, the resource manager, e.g., executing on each computer, may prioritize the decisions of the various computers to select one or more decisions or operations to perform. In one embodiment, the resource manager may use a first in time prioritization (e.g., the broadcast decision that was broadcast first is selected), a rule based prioritization (e.g., predetermined rules for selecting one of the conflicting decisions are used), or an averaged decision prioritization (the decision broadcast may the greatest number of computers is selected, i.e. if multiple computer blades broadcast a first decision versus only one computer blade broadcasts a second decision, then the first decision is selected). Other prioritization schemes are also contemplated.

BRIEF DESCRIPTION OF THE DRAWINGS

A better understanding of the present invention can be obtained when the following detailed description of the embodiment is considered in conjunction with the following drawings, in which.

Figure 1:
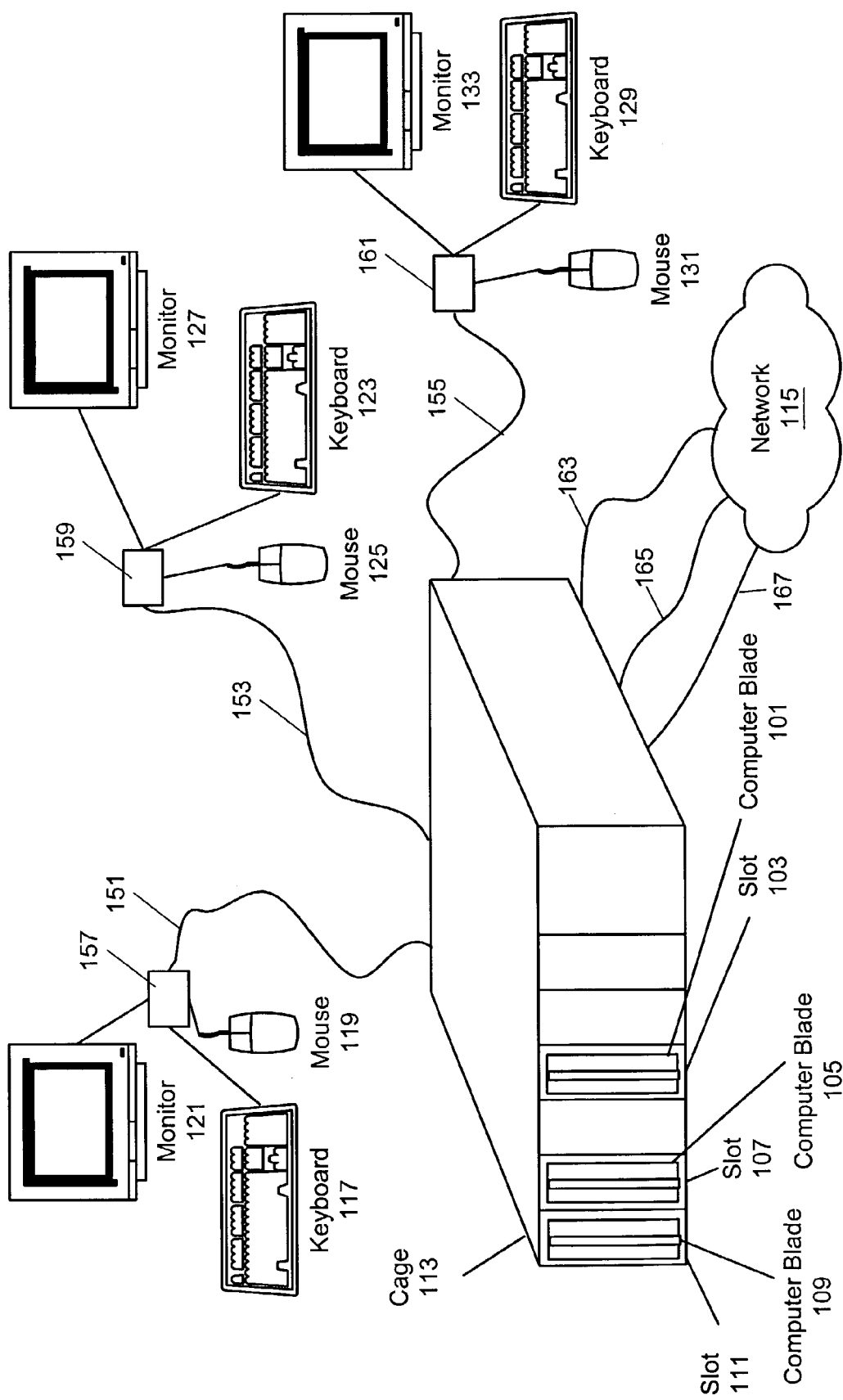
FIG. 1 illustrates computer systems including peripheral devices coupled to computer blades in a cage, according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Incorporation by Reference

The following patents and patent applications are hereby incorporated by reference as though fully and completely set forth herein:

U.S. Provisional Patent No. 60/144,809 titled "A Technique To Extend The Operating Distance Of A Universal Serial Bus" is hereby incorporated by reference in its entirety as though fully and completely set forth herein.

U.S. Pat. No. 6,119,146 titled "Computer Network Having Multiple Remotely Located Human Interfaces Sharing A Common Computing System", which was filed May 4, 1998, whose inventors are Barry Thornton, Andrew Heller, Daniel Barrett, and Charles Ely, is hereby incorporated by reference in its entirety as though fully and completely set forth herein.

U.S. Pat. No. 6,038,616 titled "Computer System With Remotely Located Interface Where Signals Are Encoded At The Computer System, Transferred Through A 4-Wire Cable, And Decoded At The Interface", which was filed May 4, 1998, whose inventors are Barry Thornton, Andrew Heller, Daniel Barrett, and Charles Ely, is hereby incorporated by reference in its entirety as though fully and completely set forth herein.

U.S. Pat. No. 6,012,101 titled "Computer Network Having Commonly Located Computing Systems", which was filed May 4, 1998, whose inventors are Andrew Heller, Barry Thornton, Daniel Barrett, and Charles Ely, is hereby incorporated by reference in its entirety as though fully and completely set forth herein.

U.S. patent application Ser. No. 09/179,809 titled "A Technique To Transfer Multiple Information Streams Over A Wire Or Wireless Medium" is hereby incorporated by reference in its entirety as though fully and completely set forth herein.

U.S. patent application Ser. No. 09/619,989 titled "System And Method For Providing A Remote Universal Serial Bus", which was filed Jul. 20, 2000, whose inventors are Dan Barrett, Mike Barron, and Andrew Heller, is hereby incorporated by reference in its entirety as though fully and completely set forth herein.

U.S. patent application Ser. No. 09/680,760 titled "System And Method For Combining Computer Video And Remote Universal Serial Bus In An Extended Cable", which was filed Oct. 6, 2000, whose inventor is Barry Thornton, is hereby incorporated by reference in its entirety as though fully and completely set forth herein.

U.S. patent application Ser. No. 09/728,667 titled "Computer On A Card With A Remote Human Interface", which was filed Dec. 12, 2000, whose inventors are Andrew Heller and Barry Thornton, is hereby incorporated by reference in its entirety as though fully and completely set forth herein.

U.S. Pat. No. 5,530,960 titled "Disk drive controller accepting first commands for accessing composite drives and second commands for individual diagnostic drive control wherein commands are transparent to each other", which was filed on Jun. 25, 1996, whose inventors are Terry J. Parks, Kenneth L Jeffries, and Craig S. Jones, is hereby incorporated by reference in its entirety as though fully and completely set forth herein.

U.S. Pat. No. 5,483,641 titled "System for scheduling readahead operations if new request is within a proximity of N last read requests wherein N is dependent on independent activities", which was filed on Jan. 9, 1996, whose inventors are Terry J. Parks, Kenneth L Jeffries, and Craig S. Jones, is hereby incorporated by reference in its entirety as though fully and completely set forth herein.

U.S. patent application Ser. No. 09/892,324 titled "Computer System Having a Remotely Located Human Interface Using Computer I/O Bus Extension", which was filed Jun. 25, 2001, whose inventors are Ray DuPont, Mike Tullis, and Barry Thornton, is hereby incorporated by reference in its entirety as though fully and completely set forth herein.

U.S. patent application Ser. No. 09/892,331 titled "System Comprising Multiple Co-Located Computer Systems Each Having a Remotely Located Human Interface Using Computer I/O Bus Extension", which was filed Jun. 25, 2001, whose inventors are Ray DuPont, Mike Tullis, and Barry Thornton, is hereby incorporated by reference in its entirety as though filly and completely set forth herein.

U.S. Provisional Application Ser. No. 60/332,143 titled "A Fail Forward Networked Storage System" filed on Nov. 21, 2001, whose inventor is Barry Thornton, is hereby incorporated by reference in its entirety as though fully and completely set forth herein.

U.S. Provisional Application Ser. No. 60/411,066 titled "Distributed Computing Infrastructure" filed on Sep. 16, 2002, whose inventors are Amir Husain, Todd Enright, and Barry Thornton, is hereby incorporated by reference in its entirety as though fully and completely set forth herein.

U.S. patent application Ser. No. 10/301,536 titled "Data Fail-Over For A Multi-Computer System" filed on Nov. 21, 2002, whose inventors are Syed Mohammad Amir Husain, Todd John Enright, and Barry W. Thornton, is hereby incorporated by reference in its entirety as though fully and completely set forth herein.

U.S. patent application Ser. No. 10/301,563 titled "System and Method for Providing Virtual Network Attached Storage Using Excess Distributed Storage Capacity" filed on Nov. 21, 2002, whose inventors are Syed Mohammad Amir Husain, Todd John Enright, and Barry W. Thornton, is hereby incorporated by reference in its entirety as though fully and completely set forth herein.

Figure 2:
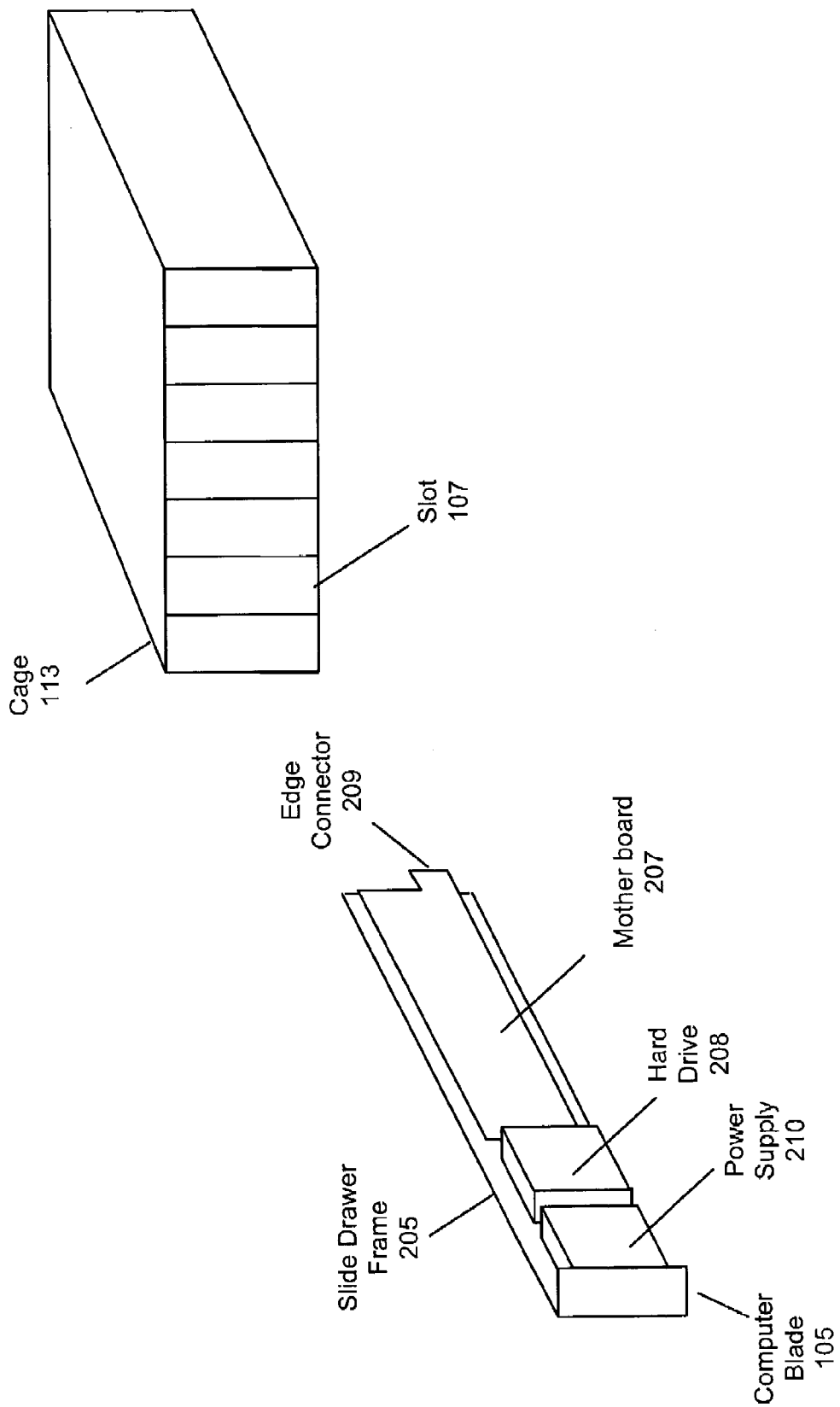
FIG. 2 illustrates a computer blade, according to one embodiment.
Figure 3:
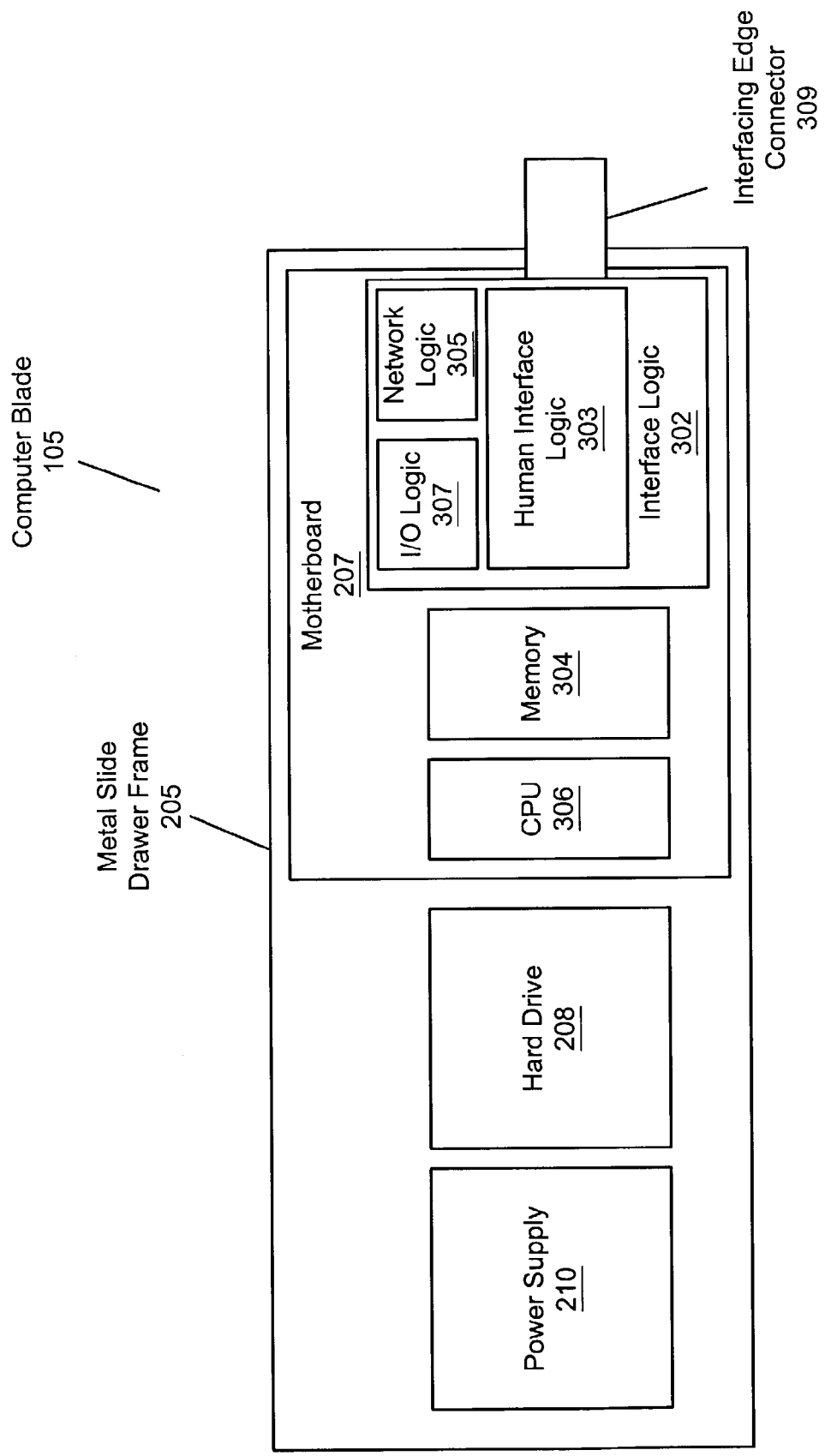
FIG. 3 illustrates a computer blade having a power supply, hard drive, and motherboard, according to one embodiment.

FIGS. 1-3—Elements of Computer Systems Used in Various Embodiments

FIGS. 1-3 illustrate computer system components that may be used in various embodiments of the invention. As FIG. 1 indicates, in one embodiment, the system may include a plurality of computer systems, where each computer system may include at least one peripheral device, e.g., comprised in a human interface, and a computer blade. The computer blade may include various components necessary for computer operations, such as, but not limited to, a processor and a storage medium. It should be noted that other types of computer systems and components may also be within the scope of the invention. For further information regarding the use of multiple computer blades in a system, please see U.S. patent application Ser. No. 09/728,667 titled "Computer On A Card With A Remote Human Interface", which was filed Dec. 12, 2000, whose inventors are Andrew Heller and Barry Thornton, which was incorporated by reference above.

As will be described in detail below, various embodiments of the present invention may be implemented using the systems of FIGS. 1-3, where, for example, computer system may comprise a plurality of computers, each having a processor and a storage medium. The network of computers may have a distributed resource manager to collect data related to computers in the network and analyze the collected data to determine one or more resource management operations. In one embodiment, one or more operation rules may be evaluated using collected data to determine if one or more resource management operations should be performed for the plurality of computers. In one embodiment, each operation rule may specify one or more conditions for a resource management operation. The resource management operations for one or more of the computers may include, but are not limited to, a single computer switch, a computer swap, a cascading move, a configuration, a backup of a storage medium, an activation or deactivation, and a transmission of a message related to usage, performance, status, and load, for a component, process, and/or attribute of said one or more computers. Other resource management operations are also contemplated.

FIG. 1—Computer Blades and Respective Peripheral Devices

Referring to FIG. 1, an embodiment of computer systems including peripheral devices coupled to computer blades in a cage is shown. While one embodiment may include computer blades, it is noted that other computer types and forms may also be within the scope of the invention. In other words, the embodiment shown in FIG. 1 is intended to be exemplary only, and is not intended to limit the types or number of computer systems used.

As FIG. 1 shows, connecting cables 151, 153, and 155 may connect computer blades 101, 105, and 109 to respective peripheral device groups, also referred to as human interfaces, through respective device ports or hubs, referred to herein as C-Ports, 157, 159, and 161. In one embodiment, each device port may comprise an extender device that may enable transmission of user interface signals (i.e., peripheral device signals) over distances generally not allowed by standard protocols such as USB. For further information regarding extended communications between a computer and a remote human interface, please see U.S. patent application Ser. No. 09/892,324 titled "Computer System Having a Remotely Located Human Interface Using Computer I/O Bus Extension", which was filed Jun. 25, 2001, and U.S. patent application Ser. No. 09/892,331 titled "System Comprising Multiple Co-Located Computer Systems Each Having a Remotely Located Human Interface Using Computer I/O Bus Extension", both of which were incorporated by reference above.

In one embodiment, the peripheral device groups, such as the peripheral device group coupled to connecting cable 151, may include a keyboard 117, a pointing device, e.g., a mouse 119, a display device, e.g., a computer monitor 121, and/or other peripheral devices for human interface. The computer blade, such as computer blade 105, may communicate with the peripheral devices coupled to the computer blade 105 by sending and receiving encoded human interface signals transmitted over the connecting cable 151. In one embodiment, a cage 113, e.g., a metal cabinet or chassis, may have a plurality of slots, such as slots 103, 107, and 111. The computer blades 101, 105, and 109 may be inserted into the slots 103, 107, and 111, respectively. The cage 113 may also include cage connectors (not shown) to couple the computer blades 101, 105, and 109 to their respective connecting cables 155, 153, and 151.

The computer blades 101, 105, and 109 may be installed in the cage 113 at a central location, while the peripheral devices for each computer blade 101, 105, and 109 may be located remotely from the cage 113, such as at respective work areas of the users of the computer blades 101, 105, and 109. The separation of the peripheral device groups from the computer blades 101, 105, and 109 may allow easier software installation across a network, such as but not limited to downloading CD-ROMs, and provide a central location of multiple computers which may simplify both hardware and software maintenance.

Each computer blade 101, 105, and 109 may also be coupled to a network 115 through an on-board network logic (not shown). The network 115 may be a Local Area Network (LAN) or a Wide Area Network (WAN), such as the Internet, although other networks, e.g., wireless, cellular, etc., are also contemplated. As mentioned above, in one embodiment, the computer blades 101, 105, and 109 may be inserted into respective slots 103, 107, and 111 of the cage 113, and coupled to respective peripheral device groups through the cage connectors (not shown) and connecting cables 151, 153, and 155. In one embodiment, each computer blade 101, 105, and 109 may also be coupled to the network 115 through the cage connectors (not shown) and a network cable, such as Ethernet cables 163, 165, and 167.

FIG. 2—Computer Blade

Referring to FIG. 2, an embodiment of a computer blade 105 is shown. In one embodiment, the computer blade 105 may include various components for computer operations, such as, but not limited to, a motherboard 207, a power supply 210, and a hard drive 208, as shown. In one embodiment, the motherboard 207, the power supply 210, and the hard drive 208 may be coupled to or mounted on a slide drawer frame 205. In one embodiment, the slide drawer frame 205 may be three rack units high (or approximately 5.25 inches), thus occupying a much smaller space than standard PC units, although other slide drawer frame 205 dimensions may also be within the scope of the invention.

The motherboard 207 may be a printed circuit board with components such as, but not limited to, a central processing unit (CPU), memory, and LAN interface. Other types of motherboards and other types of motherboard components are also contemplated. The hard drive 208 may be a non-volatile memory, e.g., a hard drive, optical drive, and/or flash memory. The computer blade 105 may communicate with external systems, e.g., peripheral devices and networks, through an edge connector 209. In one embodiment, the edge connector 209 may transmit signals such as, but not limited to, network signals, input/output (I/O) signals, video signals, audio signals, and universal serial bus (USB) signals. For example, the edge connector may communicate network signals to a network and encoded human interface signals to a group of peripheral devices.

In one embodiment, the computer blade 105 may further include power supply 210 mounted on the slide drawer frame 205 with an internal power source or coupled to an external power source (not shown) to provide power to the computer blade 105. The power supply 210 may convert local main power to an appropriate voltage for the computer blade 105. Because computer blade 105 has an individual power supply 210, if the power supply 210 fails, computer blade 105 may be the only computer blade that fails. In one embodiment, a single power supply located in the cage 113 (shown in FIG. 1) may supply power to several computer blades such as computer blades 101, 105, and 109 (shown in FIG. 1). However, a single power supply for the cage 113 (shown in FIG. 1) may be a single point of failure for the cage 113. If the single power supply fails, multiple computer blades may also fail, requiring multiple replacement blades. In a system with a single power supply for a cage 113, the computer blades 101, 105, and 109 may require one or more stand-by replacement blades connected to another power source. If the power supply for the cage 113 fails, information from the computer blades 101, 105, and 109 may be copied onto the replacement computer blades from other computer blades in the system to which information from the computer blades 101, 105, and 109 had been previously copied.

As FIG. 2 also illustrates, in one embodiment, cage 113 may have a plurality of slots, such as slot 107, to house the computer blade 105. The computer blade 105 may be inserted into one of the slots of the cage 113, such as slot 107. The cage 113 may include a cage connector (not shown) to couple to the edge connector 209 on the computer blade 105. The cage connector may also include an external second connector (not shown) that is electrically coupled to the computer blade 105 when the computer blade 105 is inserted into the slot 107. The external second connector may be further coupled to the connecting cables 151, 153, and 155 (shown in FIG. 1) for communication of the encoded human interface signals to a group of peripheral devices at a remote location. The use of the cage connectors (not shown) as an intermediate connection between computer blade 105 and the connecting cable 153 (shown in FIG. 1) may allow the removal and exchange of computer blade 105 without the need to disconnect the connecting cable 153 (shown in FIG. 1) from the cage 113. If the computer blade 105 fails, the computer blade 105 may be removed and a new computer blade (not shown) inserted in a slot, e.g., slot 107. As noted above, in a embodiment, when the computer blade 105 fails, the user's human interface, e.g., one or more peripheral devices, may be switched to a replacement computer blade (possibly in a manner that is transparent to the user), after which the failed computer blade may be removed and replaced.

FIG. 3—Computer Blade Components

Referring to FIG. 3, an embodiment of a computer blade 105 having a power supply 210, hard drive 208, and motherboard 207 is shown. The computer blade 105 may include elements that make up a standard PC, such as, but not limited to, a motherboard 207 with various components such as but not limited to a processor, e.g., a CPU 306, memory 304, and interface logic 302, which may include network logic 305, I/O logic 307, and interface logic 303, as well as other interface circuitry associated with a motherboard 207, configured on a single card. The network logic 305 may include a LAN or WAN connection, such as but not limited to a IEEE803.2 (10/100 BaseT) Ethernet, and circuitry for connecting to peripheral devices coupled to the computer blade 105. The computer blade 105 may be electrically coupled to the cage 113 (shown in FIG. 2) through the edge connector 209 that may face to the rear of the computer blade 105. In an embodiment of the invention, the computer blade 105 may slide into a slot 107 (shown in FIG. 2) of the cage 113 (shown in FIG. 2), making contact with the cage connector (not shown).

In one embodiment, the computer blade 105 may further include a network interface logic 305 included on a printed circuit board for interfacing to a network. The network logic 305 may encode network signals into a format suitable for transmission to the network. The network logic 305 may also receive encoded network signals from the network, and decode the encoded network signals. In one embodiment, the motherboard 207 may further include logic supporting PCI slot-based feature cards.

In one embodiment, the components on the computer blade 105 may be arranged from front to back for thermal efficiency. The interface logic 302 may be located at the rear of the computer blade 105, while the power supply 210 and hard disk 208 may be located at the front of the computer blade 105. In one embodiment, the computer blade 105 may have different slide drawer frame shapes, such as but not limited to square, rectangle, cubic, and three-dimensional rectangular forms. In one embodiment, the computer blade 105 may have components mounted on either side of the computer blade 105. The computer blade 105 may also have components mounted on both sides of the computer blade 105. If the slide drawer frame 205 has a three-dimensional shape, the components may be mounted on an inside surface and outside surface of the slide drawer frame 205.

Figure 4:
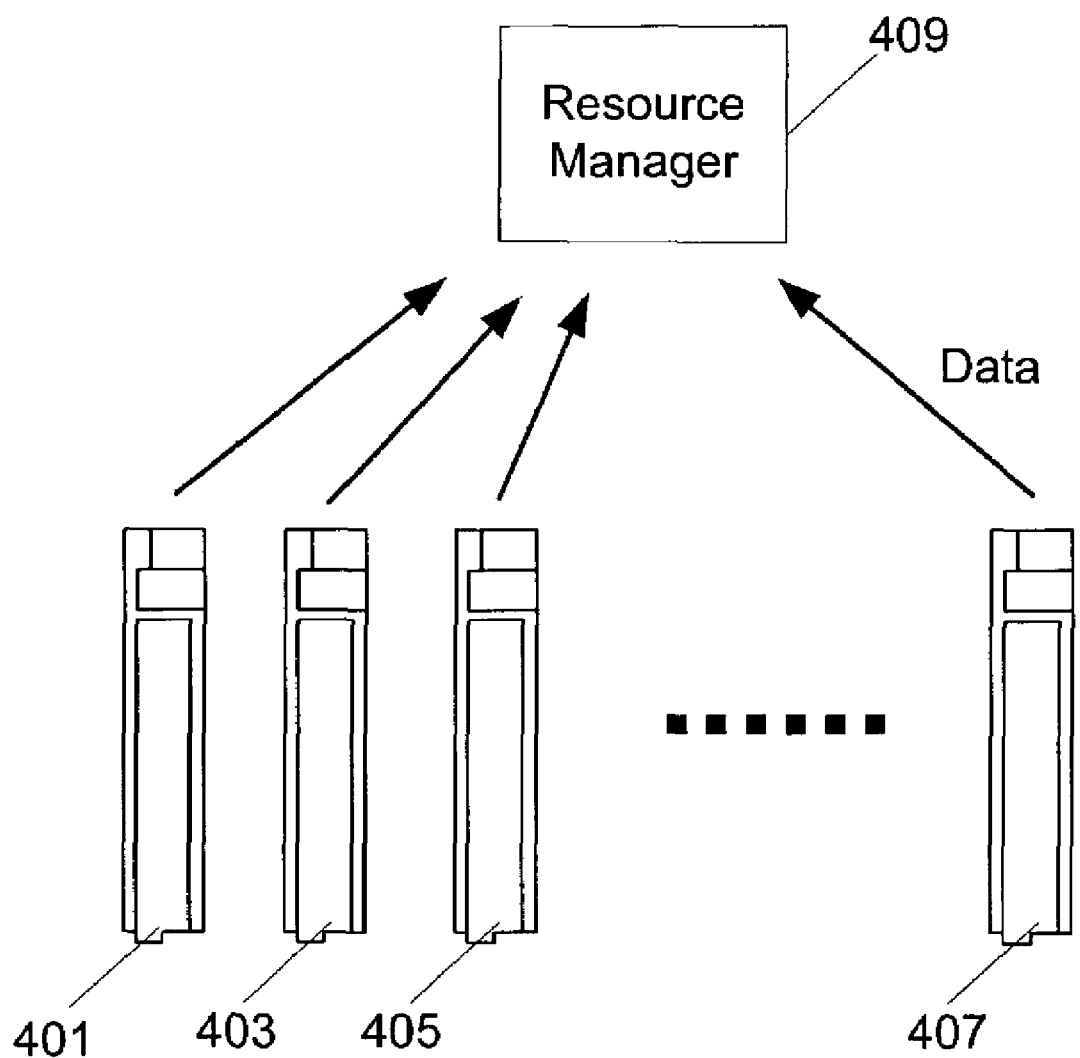
FIG. 4 illustrates a network of computers providing collected data to a distributed resource manager, according to one embodiment.

FIG. 4: A Network of Computer Blades Providing Data to a Resource Manager

FIG. 4 illustrates a network of computer blades providing data to a resource manager, according to one embodiment. The resource manager 409 may be operable to monitor and manage resource use for the plurality of computers 401, 403, 405, and 407 and associated peripheral devices. It should be noted that the embodiment shown in FIG. 4 is exemplary only, and is not intended to limit the form or numbers of computers in the network to any particular form or number. In one embodiment, the resource manager 409 may be located on one of the computer blades 401, 403, 405, and 407. In a preferred embodiment, a copy of the resource manager 409 may operate on each of the computer blades 401, 403, 405, and 407, such that a central server is not needed. In yet another embodiment, the resource manager 409 may be distributed across the plurality of the computer blades 401, 403, 405, and 407 and each computer blade may perform a respective portion of the resource manager 409, such that a central server is not needed. In each of these embodiments, the resource manager 409, or resource managers, may operate to efficiently allocate resources among the plurality of computer blades 401, 403, 405, and 407, and/or among the users of the computer blades. In addition, each computer blade may auto-discover the other computer blades on the network. In one embodiment, an auto-discovery process may be repeated periodically to discover computer blades added and/or removed from the network.

In one embodiment, the resource manager 409 may analyze data collected related to each computer of at least a subset of the plurality of computers in the network and perform a resource management operation based on the analysis. The resource manager 409 may receive data about usage, performance, status, and loads, for a component, process, and/or attribute of the computers 401, 403, 405, and 407. For example, data may include a total memory size, a used memory size, a virtual memory size, peripheral type, available ports, processor type, processor speed, type of installed applications, whether a user is logged in, frequency of logins, a processor, a hard disk, network hardware installed, network usage and/or status, usage and/or status of installed applications, video specifications, a CD-ROM, a parameter stored in an inventory database, geographical information, a parameter exported by an operating system, a parameter stored in an inventory database, such as, but not limited to geographical information regarding the computer blades, and a parameter exported by a BIOS (Basic I/O Service), among others.

In one embodiment, the data may be collected by each of the plurality of computers 401, 403, 405, and 407. For example, in one embodiment, the data may be sent to the resource manager 409 by a data collector agent resident on each computer blade. The data collector agent may automatically send the resource manager 409 data needed to determine if a resource management operation is necessary. In other words, the computer blades may have a predetermined list of data needed by the resource manager 409, and program instructions executing on each computer blade may transmit the data to the resource manager 409, e.g., according to a schedule or an event, for analysis. In another embodiment, the resource manager 409 may query each computer blade in the network for data needed in the analysis. For example, the data for a respective computer may be collected before the query, i.e., may be pre-collected, and then the pre-collected data may be sent in response to the query. In another example, the data for the respective computer may be both collected and sent in response to the query. In one embodiment, processors on each of the computers may broadcast respective data related to each of the computers to one or more others of the plurality of computers. In other words, in response to receiving a query, as a scheduled event, or even substantially continuously, computer blade 401, for example, may send data to computer blade 403 and/or computer blade 405. Other methods of making the data available to the computers for analysis are also contemplated.

In one embodiment, the data may be sent to a database coupled to the resource manager. For example, the database may be a central database for the computer blades 401, 403, 405, and 407, or, in a preferred embodiment, the database may be distributed over at least a subset of the computer blades 401, 403, 405, and 407. Other database configurations are also contemplated. The database may be managed by Structured Query Language (SQL), although other database languages may also be within the scope of the invention. In another embodiment, the resource manager may analyze data directly on each computer blade. In other words, the data may be used by each computer blade without sending the data to another computer and/or database.

In one embodiment, based on the collected data, the resource manager 409 may compute demand and usage metrics or other issues (e.g., processor time, memory usage and demand, hard drive memory, and network information). The resource manager 409 may also generate reports based on the metrics and optionally on applications and links used by the system, e.g., usage patterns for the network resources. These patterns may be used to generate a map of the demands on the system's collective resources over time. The continually updated map may be used by the system administrator and/or the resource manager 409 in order to perform predictive and proactive scheduling of resources to users. Other uses of the map may also be within the scope of the invention.

Figure 5:
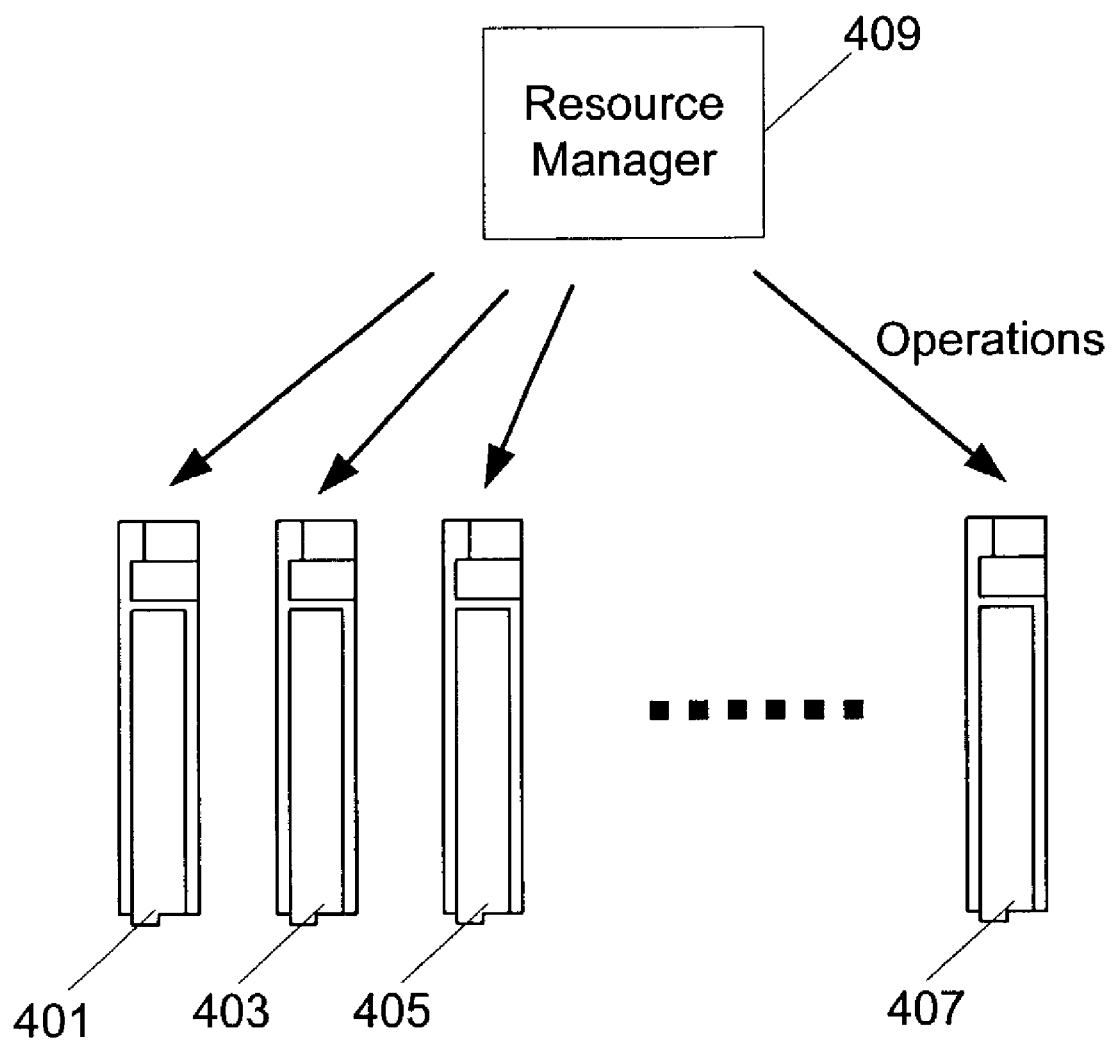
FIG. 5 illustrates a network of computer blades receiving resource management operations from a resource manager, according to one embodiment.

FIG. 5: A Network of Computer Blades Receiving Resource Management Operations From a Resource Manager FIG. 5 illustrates the network of computer blades of FIG. 4 receiving resource management operations from a resource manager, according to one embodiment. In one embodiment, the resource manager 409 may analyze the data collected from each computer blade in the network to determine one or more resource management operations for the computer blades. For example, a "resource management operation" may include operations for one or more of the computer blades such as, but not limited to, a single computer switch, a computer swap, a cascading move, a configuration, a backup of a storage medium, an activation or deactivation, a storage operation, an execution or termination of a program, and a transmission of a message related to usage, performance, status, and load, for a component, process, and/or attribute of the computer blades. In one embodiment, the resource manager 409 may continuously collect data and analyze the collected data to determine resource management operations that may be performed. In another embodiment, the resource manager 409 may schedule the collecting the data and the analyzing the collected data and then perform the collecting and analyzing according to the schedule. In yet another embodiment, the resource manager 409 may collect and analyze the data in response to events and/or in response to human input, e.g., from a system administrator.

In one embodiment, operation rules which indicate whether one or more of the resource management operations needs to be performed may be used in the analysis. The operation rules may specify conditions for a resource management operation. For example, an operation rule may specify that if a temperature of a computer blade 401 is above a certain threshold, then a fan speed of a fan coupled to the computer blade 401 should be increased. Each operation rule may return an operation indicator value. The operation indicator value may indicate a strength of the condition for the resource management operation. For example, if an operation rule analyzes the temperature of a computer blade 401, an operation indicator value of 0 may be returned to indicate that the temperature of the computer blade 401 is below the threshold, and a 1 to indicate that the temperature of the computer blade 401 is above the threshold. In a preferred embodiment, the operation indicator value may be a multivalent value. In other words, rather than being limited, for example, to a 0 or a 1, the value may range over all values from 0 to 1. This type of value may be particularly useful in the application of fuzzy logic (or its functional equivalent) to make final determinations as to which operations to perform, as described in more detail below.

In one embodiment, more than one operation rule may be used to determine if a resource management operation should be performed. For example, in determining whether to swap two computer blades 401 and 403, several operation rules may be analyzed. Operation rule 1 may determine if the processor of computer blade 401 has a higher usage rate than computer blade 403. An operation indicator value of 0 may be returned if the usage rate of the computer blade 401 is less than the usage rate of computer blade 403. An operation indicator of 1 may be returned if the usage rate of the processor of computer blade 401 is higher than computer blade 403. Operation rule 2 may determine if the processor speed of computer blade 401 is higher than the processor speed of computer blade 403. An operation indicator value of 0 may be returned if the processor speed of computer blade 401 is higher than the processor speed of computer blade 403. An operation indicator value of 1 may be returned if the processor speed of computer blade 401 is lower than the processor speed of computer blade 403. In another embodiment, the operation indicators may have values between 0 and 1 (or between −1 and +1), indicating the degree to which the metrics differ between the two computers.

In one embodiment, if there is more than one operation rule to determine if a resource management operation should be performed, then a resultant indicator value may be determined based on the operation indicator values returned by the evaluation of the operation rules. In other words, the various indicator values from the various operation rules may be combined or used to generate a single resultant indicator value. The decision of whether to perform the resource management operation may then be based on the resultant indicator value. In one embodiment, a weighted sum of the calculated indicator values may be computed to generate the resultant indicator value. Each calculated indicator value may be weighted with a respective weighting coefficient before being summed into a resultant indicator value. Other methods for computing a resultant indicator value are also contemplated. For example, a Bayesian decision-making network, a predicate logic, a fuzzy logic, an averaging technique, a percentage majorities technique, an at least one technique, and/or an at least none technique may be used, among others.

For example, in the above example of determining whether to swap a computer blade 401 with a computer blade 403, the operation indicator value for operation rule 1 and the operation indicator value for operation rule 2 may be used to decide whether to perform the swap. In one embodiment, a simple average of the operation indicator values may be computed for the resultant indicator value. For example, if the operation indicator value for the operation rule 1 equals 1 and the operation indicator value for the operation rule 2 equals 1, the resultant indicator value may be computed to equal 1 (i.e., (1+1)/2=2/2=1). If the operation indicator value for the operation rule 1 equals 0 and the operation indicator value for the operation rule 2 equals 1, the resultant indicator value may be computed to equal 0.5 (i.e., (0+1)/2=0.5). In one embodiment, the resultant indicator may indicate a probability of performing the operation. In determining whether to perform the swap, predetermined criteria may be used. For example, in one embodiment, the swap may only be performed if the resultant indicator value is equal to 1 (i.e., the usage rate of the processor of the computer blade 401 is higher than the usage rate of the computer blade 403 and the processor speed of computer blade 401 is less than the processor speed of computer blade 403). Other predetermined criteria may also be contemplated. Thus, by collecting data and analyzing operation rules, the resource manager may determine whether any of a wide range of available resource management operations need to be performed.

In one embodiment, the resource manager 409 may include or invoke a move manager (or its equivalent) to move users from their respective current computers to other computers, for example, in a single computer switch, a computer swap, or a cascading move, as described in detail below with reference to FIGS. 7-10. For example, a single computer switch may comprise switching a user from a first computer, such as computer blade 401, to a second computer blade, such as computer blade 403. In one embodiment, switching the user from the first computer to the second computer may involve transferring at least a portion of information from the computer blade 401 (e.g., stored on a storage medium of computer blade 401) to the computer blade 403 (e.g., to a storage medium of computer blade 403), and switching at least one peripheral device from the first computer to the second computer, e.g., switching a human interface from the first computer to the second computer. For example, if computer blade 403 is a new computer blade, analysis of operation rules using data collected from the computer blade 401 and the computer blade 403 may return a resultant indicator value indicating that computer blade 401 should be switched with computer blade 403. In other words, the user of the computer blade 401 will be using the computer blade 403 after the switch is performed.

In one embodiment, computer blade 401 may be swapped with computer blade 403 using the move manager. Swapping the computer blade 401 with the computer blade 403 may involve a single computer switch from the first computer to the second computer, as described above, and a single computer switch from the second computer to the first computer. For example, if computer blade 401 has a high processor usage and a low processor speed, and computer blade 403 has a low processor usage and a high processor speed, analysis of operation rules using data collected from the computer blade 401 and the computer blade 403 may return a resultant indicator value indicating that computer blade 401 should be swapped with computer blade 403. In other words, after the swap, the original user of the computer blade 401 will be using the computer blade 403 and the original user of the computer blade 403 will be using the computer blade 401.

In one embodiment, the move manager may perform a cascade move, e.g., on the computer blade 401, the computer blade 403, and the computer blade 405. The cascade move with the computer blade 401, the computer blade 403, and the computer blade 405 may involve a plurality of single computer switches for the sequence of computer blades 401, 403, and 405. In one embodiment, each respective user of a first computer through a penultimate computer (second to last one) in the sequence of computers may be switched to a respective successor computer of the sequence of computers. For example, if computer blade 405 is a new computer, and computer blade 403 is a higher performance computer blade than computer blade 401, but computer blade 403 has a higher demand than the computer blade 401, analysis of operation rules using data collected from the computer blade 401, computer blade 403 and computer blade 405 may return a resultant indicator value indicating that computer blade 403 should be moved to computer blade 405 and computer blade 401 should be moved to computer blade 403 (i.e., a cascading move involving computer blades 401, 403, and 405). In other words, the user of computer blade 403 will get the new computer and the user of the computer blade 401 will get the computer blade 403. The now un-used computer blade 401 may then be retired, used as a backup computer, or possibly switched with yet another computer in the network, as desired and/or as the operation rules indicate.

In one embodiment, the resource management operations may include configuring one or more computers in the network. For example, the resource management operations may include configuring a fan speed, installing or removing a file or program, activating or deactivating a peripheral device, and/or formatting a storage medium, among others. Other configurations are also contemplated. For example, data may be collected from the computer blades related to one or more conditions in the network of computer blades that may be modified. An analysis of the collected data may return a resultant indicator value indicating whether a configuration should be modified. For example, collected data from computer blade 401 may include a temperature of a processor or board on a computer. An analysis of the temperature of the processor or board may return a resultant indicator value to indicate that the temperature is above a safe threshold. The operation rule used to analyze the temperature may indicate that a fan speed of a fan on or near the computer blade 401 may need to be increased (i.e. to decrease the temperature of the processor or board). Other resource management operations may also be indicated by operation rules analyzed by the resource manager 409. For example, if data collected about the temperature of the processor or board of the computer blade 401 and the fan on or near the computer blade 401 is analyzed and the resultant indicator value returned indicates that the temperature of the processor of the computer blade 401 is above a safe threshold and the fan speed is at a maximum fan speed, the resource manager 409 may perform one or more resource management operations to avert damage to the computer blade 401, including, for example, deactivating the computer blade 401.

In one embodiment, the resource manager 409 may also transmit a message, such as, but not limited to, an email, to a system administrator or a user indicating that a computer blade 401 has been or is to be deactivated because of a high temperature of the processor or board of the computer blade 401. Other messages are also contemplated. In one embodiment a resource management operation may include execution or termination of a program, such as, but not limited to, the shutdown or startup of a service or standalone application on one or more computers. For example, a resource manager 409 may shutdown a virus detection application in order to perform maintenance. In one embodiment, the resource manager 409 may activate or deactivate a computer, including putting a computer in standby mode. In one embodiment, a resource management operation may include a storage operation, such as, but not limited to disk defragmentation, file deletion, and/or cleanup of temporary files, among others.

In one embodiment, the resource management operations may be performed by the resource manager 409 automatically (i.e., without human input). In another embodiment, a resource manager 409 may indicate to a human one or more resource management operations that have been determined to be needed by the network. The resource manager 409 may receive input from the human initiating the one or more resource management operations. The resource manager 409 may then perform the resource management operations in response to the received input. In one embodiment, the resource manager 409 may automatically perform some resource management operations (e.g.—emergency deactivation of computer blade 401 if the temperature of the processor goes above a safe threshold and the fan near the processor is at a maximum fan speed) while indicating others to a human and waiting for human input before proceeding (e.g. swapping computer blade 401 with computer blade 403). In one embodiment, after determining that one or more resource management operations need to be performed, the resource manager 409 may schedule the one or more resource management operations and perform the one or more resource management operations in accordance with the schedule.

In one embodiment, the resource manager may be distributed across each computer in the network of computers such that each computer may perform the collecting data, analyzing the data, and performing the resource management operations substantially concurrently. In other words, each computer in the network may be analyzing collected data about each computer in the network at the same time. For example, computer blade 401 may analyze collected data from computer blade 403 using operation rules to determine that a temperature on a processor of computer blade 403 is above a threshold, and therefore a resource management operation including increasing a fan speed of a fan on or near the processor of the computer blade 403 needs to be performed. At substantially the same time, computer blade 403 may be analyzing collected data from computer blade 401 and 405 to determine that computer blade 401 and computer blade 405 need to be swapped. In one embodiment, computer blade 401 may broadcast to at least a subset of the computers in the network a decision that the speed of the fan near the processor of the computer blade 403 needs to be increased. The computer blade 403 may broadcast to at least a subset of the computers in the network a decision that computer blade 401 and computer blade 405 need to be swapped. In one embodiment, if the broadcast decisions (e.g., operations) conflict, the (or each) resource manager may prioritize the broadcast decisions to select one or more decisions to implement. For example, if computer blade 403 broadcasts a decision that computer blade 401 and computer blade 405 should be swapped and computer blade 405 broadcasts a decision that computer blade 403 and computer blade 405 should be swapped, the resource manager may prioritize the broadcast decisions to select one of the broadcast decisions. In various embodiments, the resource manager may use a first-in-time prioritization (e.g., the broadcast decision that was broadcast first is selected), a rule based prioritization (e.g., predetermined rules for selecting one of the conflicting decisions are used), and/or an averaged decision prioritization (the most broadcasted decision is selected (i.e. multiple computer blades broadcast the same decision versus only one computer blade broadcasts a decision). Other prioritization schemes are also contemplated.

Thus, in one embodiment, the resource manager executing on each of the plurality of computers may operate to collect and analyze data related to one or more others (and optionally all others) of the plurality of computers, determine one or more proposed resource management operations, and broadcast the determined operations to others of the plurality of computers. Each resource manager may then resolve conflicts among the proposed operations, thereby determining resultant operations, and perform the resultant operations on the one or more others of the plurality of computers.

Figure 6:
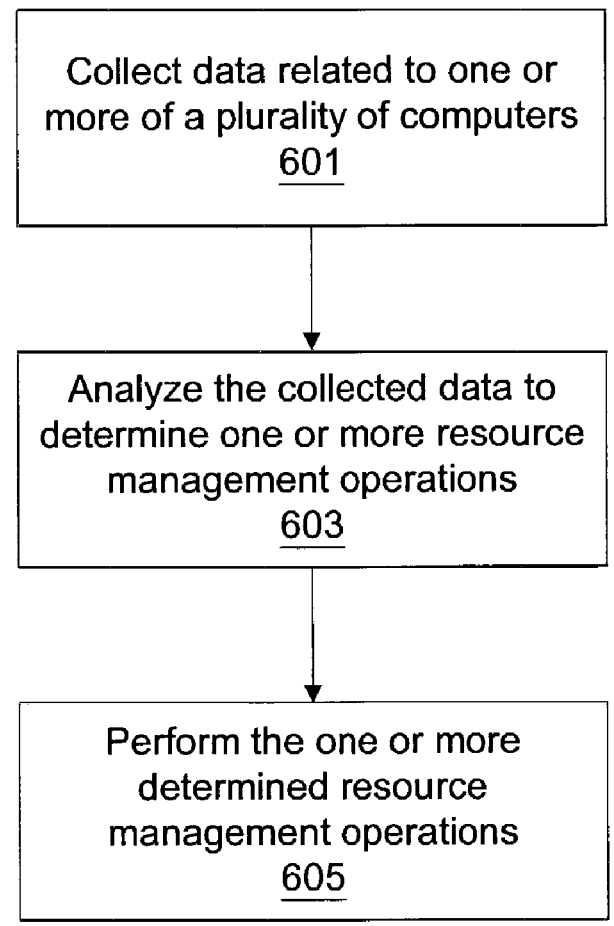
FIG. 6 illustrates a flowchart for a distributed resource manager method, according to one embodiment.

FIG. 6: Method for a Distributed Resource Manager

FIG. 6 illustrates a flowchart for a distributed resource manager method, according to one embodiment. Various embodiments of the methods described below may be implemented in using embodiments of any of the systems described above, where a network of computers store and execute distributed resource manager software to collect data related to computers in the network and analyze the collected data to determine one or more resource management operations. It should be noted that in various embodiments of the methods described below, one or more of the steps described may be performed concurrently, in a different order than shown, or may be omitted entirely. Other additional steps may also be performed as desired.

In 601, data may be collected related to one or more of a plurality of computers. The collected data may relate to one or more of usage, performance, status, and load, for a component, process, and/or attribute of one or more computers. In one embodiment, the data may relate to one or more of a total memory size, a used memory size, a virtual memory size, peripheral type, available ports, processor type, processor speed, type of installed applications, whether a user is logged in, frequency of logins, a processor, a hard disk, network hardware installed, network usage and/or status, usage and/or status of installed applications, video specifications, a CD-ROM, a parameter stored in an inventory database, geographical information, a parameter exported by an operating system, and a parameter exported by a BIOS (Basic I/O Service), among others.

In one embodiment, the data may be collected by a collector agent executing on each of the one or more computers. In one embodiment, after collecting the data, the collector agent may send the data to a central database. In another embodiment, the database may be distributed over at least a subset of the one or more computers. The collector agent may send the data to the database periodically, substantially continuously, may have scheduled times to send the data, and/or may send the data in response to a query from one or more computers. In one embodiment, one or more computers may query one or more other computers for the data. Each of the one or more computers may send queried data in response to said query, and may each also collect respective queried data. Other methods of collecting data are also contemplated.

For example, usage data may be collected from each computer, including, for example, a memory usage, a disk activity, and a processor usage. In one embodiment, data may take the form of a particular value of a particular characteristic on the computer, or may be a representative, e.g., average, value. Other data forms are also contemplated. For example, collector agents on a computer blade may collect a memory usage equal to 0.8, a disk activity equal to 0.92, and a processor usage equal to 0.72. The collected data may be categorized by workstation. In other words, the collected data may be stored in a database or sent to another computer grouped or organized by workstation, e.g., by computer blade. In one embodiment, multiple collected data from one workstation may be compounded into a single value. For example, a compound value generator may use a predetermined rule to compound the memory usage (0.8), the disk activity (0.92), and the processor usage (0.72) into a single compound representative value, e.g., 0.75, for the computer. Other predetermined rules and other representative values are also contemplated.

In 603, the collected data may be analyzed to determine one or more resource management operations for one or more of the plurality of computers. In one embodiment, one or more operation rules may be evaluated using the collected data to determine if one or more resource management operations should be performed for the plurality of computers. In one embodiment, each operation rule may specify one or more conditions for a resource management operation. In evaluating each operation rule, an operation indicator value may be calculated to indicate a strength of the conditions for the resource management operation. In one embodiment, the calculated indicator values for the operation rules may be analyzed to determine a resultant indicator value for the resource management operation. In one embodiment, calculating the resultant indicator value may involve computing a weighted sum of the calculated indicator values by adding together each indicator value after each indicator value is weighted by a respective weighting coefficient. Other methods of determining a resultant indicator values contemplated may include, but are not limited to, a Bayesian decision-making network, predicate logic, fuzzy logic, an averaging technique, a percentage majorities technique, an at least one technique, and an at least none technique, among others.

For example, using the collected data (i.e., the memory usage (0.8), the disk activity (0.92), and the processor usage (0.72)), or the single compound representative value (i.e., a single compound representative value of 0.75), from the above example, an operation rule may be evaluated and/or analyzed to determine a resource management operation. Other data may also be used in the analysis. For example, in one embodiment, an operation rule may take the form:

if (loadA>110% of loadB) AND (powerA<80% of
        PowerB) switch

In other words, if the load on computer A (i.e. a collected datum or a single compound representative value related to a usage, status, or load of computer A) is greater than 1.1 multiplied times the load on computer B and the power, e.g., performance, of a component, process and/or attribute of computer A is less than 0.8 multiplied times the power of a component, process, and/or attribute of a computer B, a decision to perform a resource management operation of a switch will be made. In the above example, loadA and the loadB may be the single compound representative values representing load or demand for respective computer A and computer B. The values powerA and powerB may be collected data related to respective performance and/or status of computer A and computer B, e.g., based on hardware specifications. Other collected data sources, other variable types, and other operation rule formats are also contemplated. The decision to switch returned by the analysis of the operation rule may take the form of an operation indicator value. As mentioned above, multiple operation indicator values may be further analyzed to produce a resultant indicator value representative of a decision as a whole as to whether to perform the resource management operation associated with the operation rules.

In 605, the one or more determined resource management operations may be performed. As described above, the resource management operations for one or more of the computers may include, but are not limited to, a single computer switch, a computer swap, a cascading move, a configuration, a backup of a storage medium, an activation or deactivation, a storage operation, an execution or termination of a program, and a transmission of a message related to usage, performance, status, and load, for a component, process, and/or attribute of said one or more computers. Other resource management operations are also contemplated. In one embodiment, resource management operations may be performed automatically, i.e., without human input. In one embodiment, the resource manager may indicate one or more resource management operations to a human and perform the one or more resource management operations after receiving input from the human initiating the one or more resource management operations.

As mentioned above with reference to FIG. 5, because the resource manager may be distributed across the plurality of computers, in one embodiment, the decisions of each computer may be broadcast to each of the other computers in the network. If various decisions from various computers are in conflict, the resource manager (or resource managers) may prioritize the decisions of the various computers to select one or more decisions to follow or operations to perform. In one embodiment, the resource manager may use a first-in-time prioritization (e.g., the broadcast decision that was broadcast first is selected), a rule based prioritization (e.g., predetermined rules for selecting one of the conflicting decisions are used), or an averaged decision prioritization (the most broadcasted decision is selected (i.e. multiple computer blades broadcast the same decision versus only one computer blade broadcasts a decision then the most broadcasted decision is selected). Other prioritization schemes are also contemplated.

FIGS. 7-10—Move Manager Embodiments

In one embodiment, a move manager may provide the ability to undertake individual, workgroup, and/or department-level hardware moves. For example, the move manager may be used when a fail-over condition is detected on a computer blade to restore the computer blade to a replacement computer blade. For further information regarding data fail-over management, please see U.S. patent application Ser. No. 10/301,536 titled "Data Fail-Over For A Multi-Computer System" filed on Nov. 21, 2002, which was incorporated by reference above.

The move manager may also migrate an operating system, applications, and/or information from a user's old computer blade to a new computer blade without detecting a fail-over condition. In one embodiment, the move manager may provide the ability to schedule moves to prevent network saturation during peak work hours. A scriptable interface may allow an administrator to control a move process and optionally insert custom tasks or activities for execution prior to initiating the move process, or upon the completion of a move. The move manager may also allow a system administrator to use a scriptable interface to add custom tasks to a move process. In various embodiments, the move process may include one or more of a one-to-one move (also referred to as a single computer switch), a cascading move, and a swap move, as discussed below.

Figure 7:
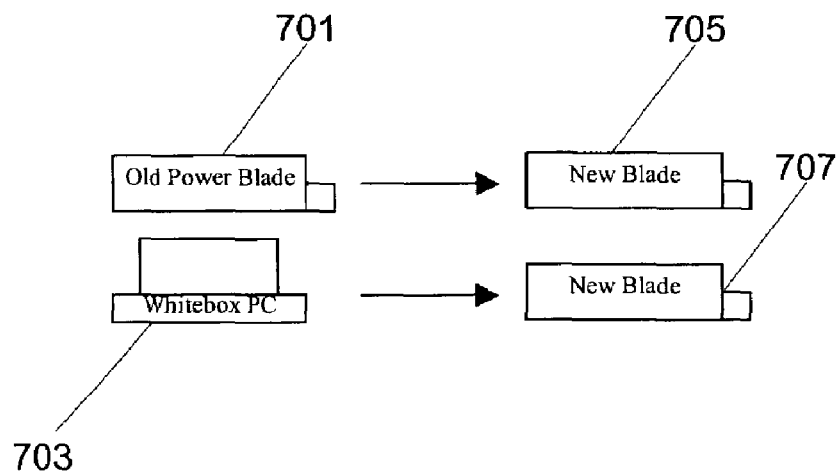
FIG. 7 illustrates a one-to-one move, according to two embodiments.

FIG. 7—A One-to-One Move (Single Computer Switch)

FIG. 7 illustrates a one-to-one move, also referred to as a single computer switch, according to two embodiments. In one embodiment, a single user of an existing computer, e.g., an old computer blade 701, may be moved to new computer blade 705. In another embodiment, a user of a legacy Whitebox PC 703 may be moved or switched to new computer blade 707. For example, the user may be moved for a hardware upgrade or unreliable performance of existing hardware. User preferences (such as desktop settings and icons) may be combined with other information and transferred over a network to the new computer blades 705 and 707 as a series of backup files (e.g., collected in archives or as "snapshots"). In one embodiment, the backup files may be compressed packages for network transmission. In addition, a delta-based backup method may be used.

It is noted that in a preferred embodiment, the "old" computer is associated with (i.e., is coupled to) at least one peripheral device, e.g., comprising a human interface for that computer. The old computer may be coupled to the at least one peripheral device through a peripheral switch, which may also be coupled to each of the other computers in the network.

Thus, in one embodiment, a first computer (e.g., a user of the first computer) may be switched to the second computer in a one to one move by copying at least a portion of the information from the first computer to the second computer, and by switching the east one peripheral device from the first computer over to the second computer, e.g., using the peripheral switch.

Figure 8:
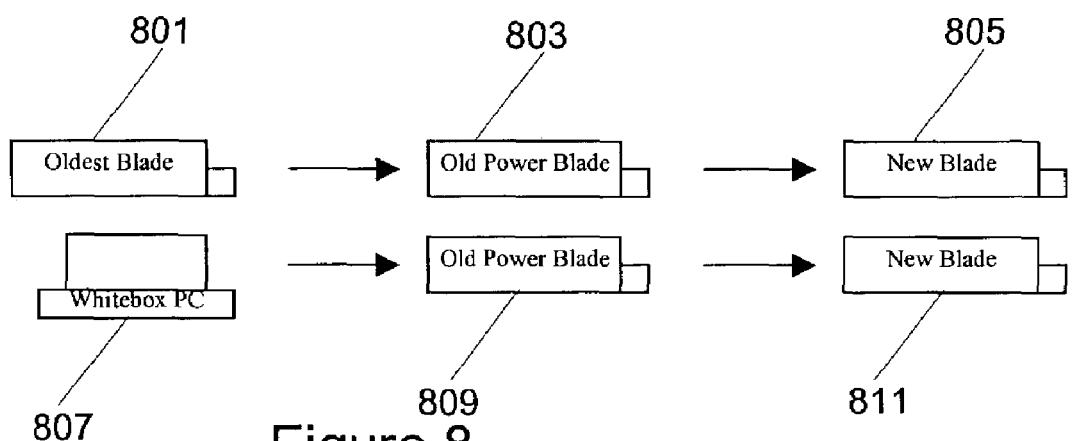
FIG. 8 illustrates a cascading move, according to two embodiments.

FIG. 8—Cascading Move

In one embodiment, a cascade move may be performed, e.g., as a resource management operation. For example, if a new powerful computer is added to the network, multiple users may be upgraded to computers more powerful than their currently assigned machines, e.g., based on computation needs, seniority, etc., where, for example, user A gets moved to the new computer, user B gets moved to user A's old computer, user C gets moved to user B's old computer, and so on. Thus, in this approach, the information from the first computer (user B's old computer) may be copied to the second computer (user A's old computer) while the information from the second computer (user A's old computer) is copied onto a third computer (the new computer). A peripheral switch may switch the first peripheral (i.e., user B's human interface) over to the second computer and may switch the second peripheral (i.e., user A's human interface) over to the third computer. Other switches may also be within the scope of the invention. For example, in one embodiment, a single peripheral switch may provide switching for all of the human interfaces. Alternatively, there may be a peripheral switch per computer or human interface. In yet another embodiment, the system may include a peripheral switch for each of a number of subsets of the computers/human interfaces.

FIG. 8 illustrates an embodiment of a cascading move where pairs of old computers are upgraded, possibly in parallel. In the embodiment shown, upon the arrival of a new set of computer blades 805 and 811, old computer blades 803 and 809, may be moved to new computer blades 805 and 811, respectively. Computers older than old computer blades 803 and 809, such as computer blade 801 and legacy Whitebox PC 807, may be moved onto the old computer blades 803 and 809, respectively. Other computers may also be within the scope of the invention. Thus, for each upgrade path or series shown, a cascading move may be managed between a first computer, a second computer, and a third computer. In one embodiment, a copy of at least a portion of the information from the first computer may be copied onto the storage medium of the second computer. Information from the second computer may be copied onto a third computer. The peripheral switch may route signals from the first peripheral device to the second computer and from the second peripheral device to the third computer. Of course, in other embodiments, a cascading move may be performed for more than three computers. In another embodiment, a cyclic cascading move may be performed in which the users are moved in round-robin fashion to respective successor machines, i.e., where in the example above, user A gets move to user C's old computer, rather than to a new machine.

FIG. 9—Swap Move

In one embodiment, an operation rule may indicate a need to swap the first computer with the second computer, e.g., to improve performance for a user, or to change environments (e.g., from Microsoft Windows™ to Apple MacOS™). For example, if the second computer is a higher performing computer, and the user of the first computer needs more computational power than the user of the second computer, the computers assigned to each user may be swapped. In other words, the first computer (or another computer) may copy the information from the first computer over to the second computer, and the second computer (or another computer) may copy the information from the second computer onto the first computer. Similarly, a peripheral switch may swap the human interfaces for the respective computers, e.g., by routing signals from a first peripheral device (originally routed to the first computer) to the second computer, and from a second peripheral device (originally routed to the second computer) to the first computer.

Figure 9:
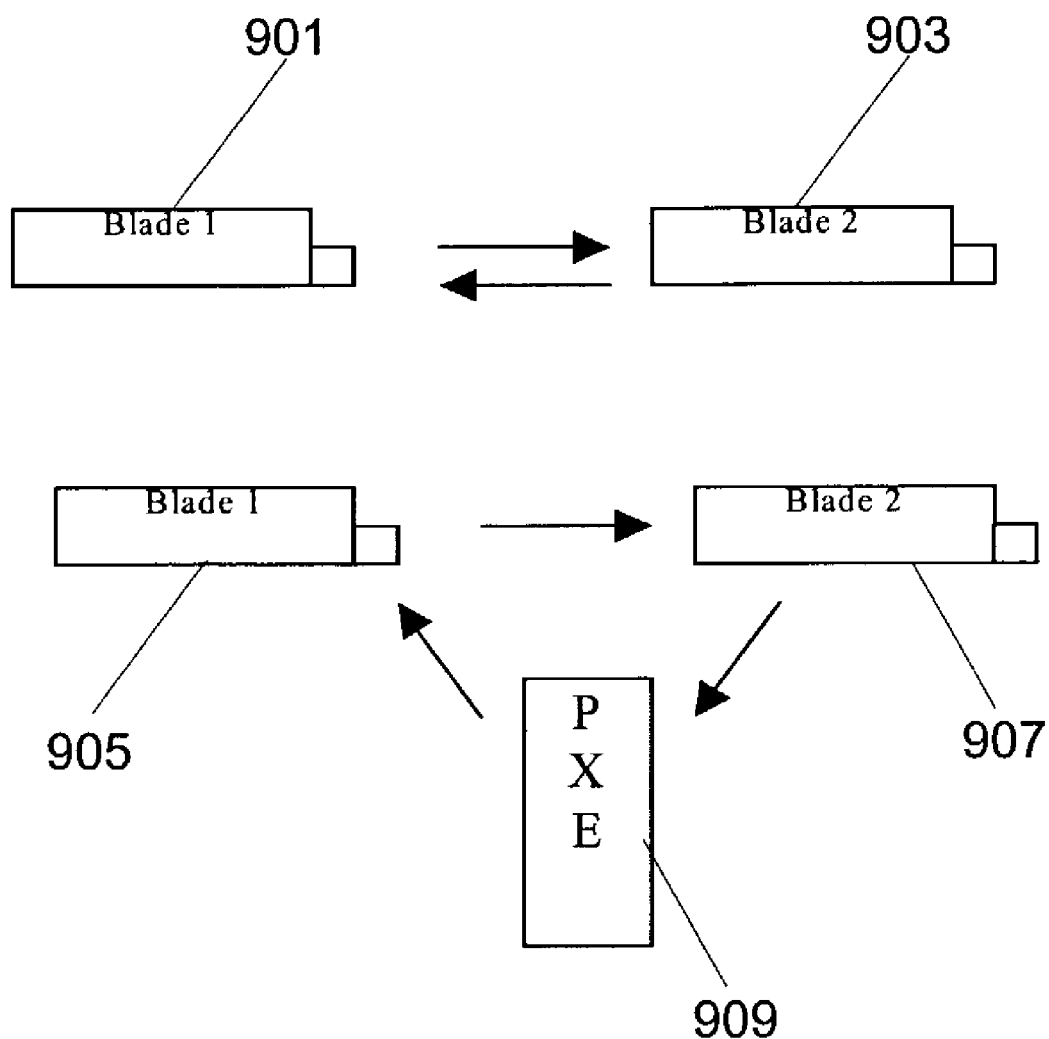
FIG. 9 illustrates a swap move, according to one embodiment.

FIG. 9 illustrates a swap move, according to one embodiment. As mentioned above, a swap move may be used to equalize or adjust the use of resources in a network (e.g., to put more demanding users with faster computer blades). In one embodiment, the computer blades may be switched for two users, such as computer blades 901 and 903, although more complex n-tuple switches may also be performed. After the move or switch, information from one computer blade 901, e.g., applications and settings, may be present on another computer blade 903 post move, and vice-versa. In one embodiment, information from one of the computer blades 905 and 907 involved in the switch may be stored in a temporary third location to preserve contents of the target computer blade 907 while the switching computer blade 905 overwrites the target computer blade's information. For example, an intermediate image server 909 (based on PXE technology) may be used. Large-scale moves may also be within the scope of the invention. When moving or switching multiple computer blades, moves may be scheduled for Operating System settings, profiles, applications, and user information from old computer blades to new computer blades.

Thus, in one embodiment of a swap move, at least a portion of the information from the storage medium of the first computer may be stored onto the storage medium of second computer, and at least a portion of the information from the storage medium of the second computer may be stored onto the storage medium of said first computer. The peripheral switch may switch the signal routing from the first peripheral device to the first computer to route to the second computer and the signal routing from the second peripheral device to the second computer to route to the first computer.

Figure 10:
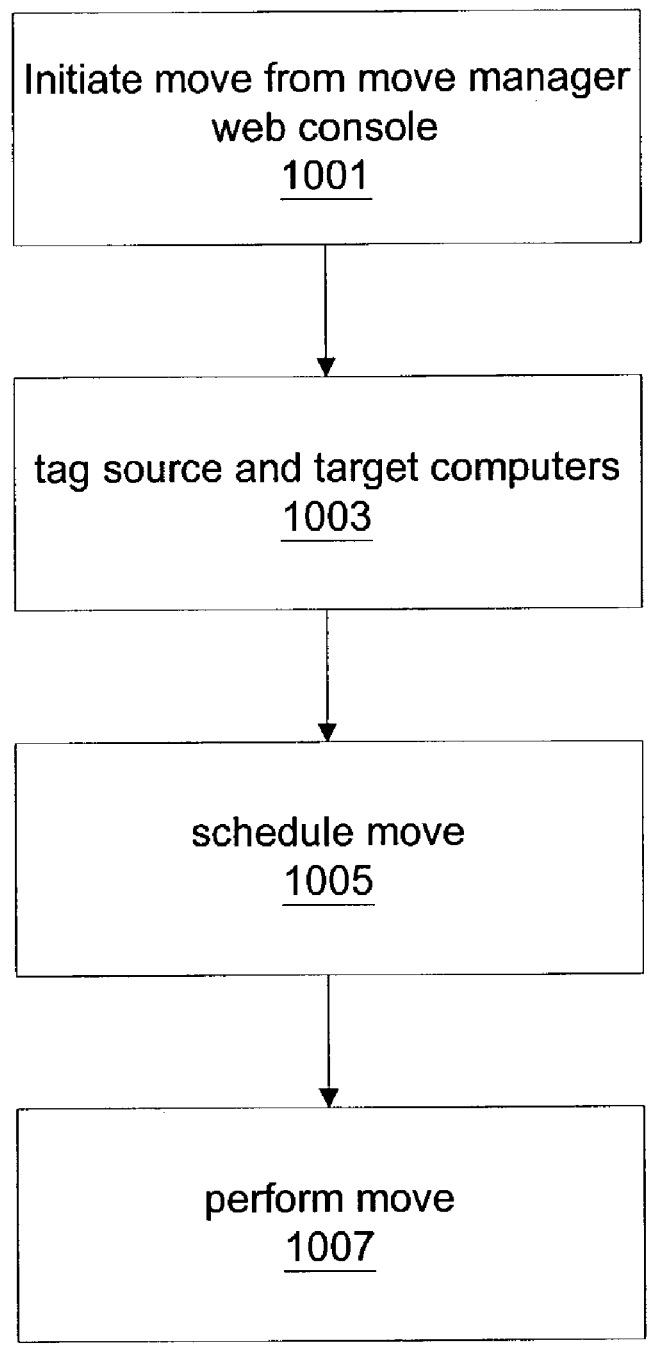
FIG. 10 flowcharts an initiation and process of a move, according to one embodiment.

FIG. 10—Flowchart of a Move Process

FIG. 10 flowcharts an initiation and process of a single computer move, according to one embodiment. It should be noted that in various embodiments of the method described below, one or more of the steps described may be performed concurrently, in a different order than shown, or may be omitted entirely. Other additional steps may also be performed as desired.

As FIG. 10 shows, in 1001, a move may be initiated, e.g., by a system administrator, or programmatically, i.e., automatically. For example, the move may be initiated as a result of one or more operation rules, or the system administrator may initiate the move from a move manager web console or other user interface.

In 1003, source and target computer blades may be tagged. In other words, one or more source/target pairs may be specified where information from each source computer is to be moved to the respective target computer, and/or one or more respective peripheral devices are to be switched from each source computer to the respective target computer.

In 1005, a move may be scheduled. Depending on the number of machines being moved, a schedule may be set to activate an image/backup process and move process at night to avoid any network saturation or other inconveniences during the work day.

Finally, in 1007, the scheduled move may be performed. In other words, at least a portion of the information from the source computer may be moved to the target computer, and any peripheral devices comprised in the human interface for the source computer may be switched to the target computer.

It is noted that any of the various moves described above (e.g., single computer switch, computer swap, and cascading move) may follow a similar process.

Figure 11:
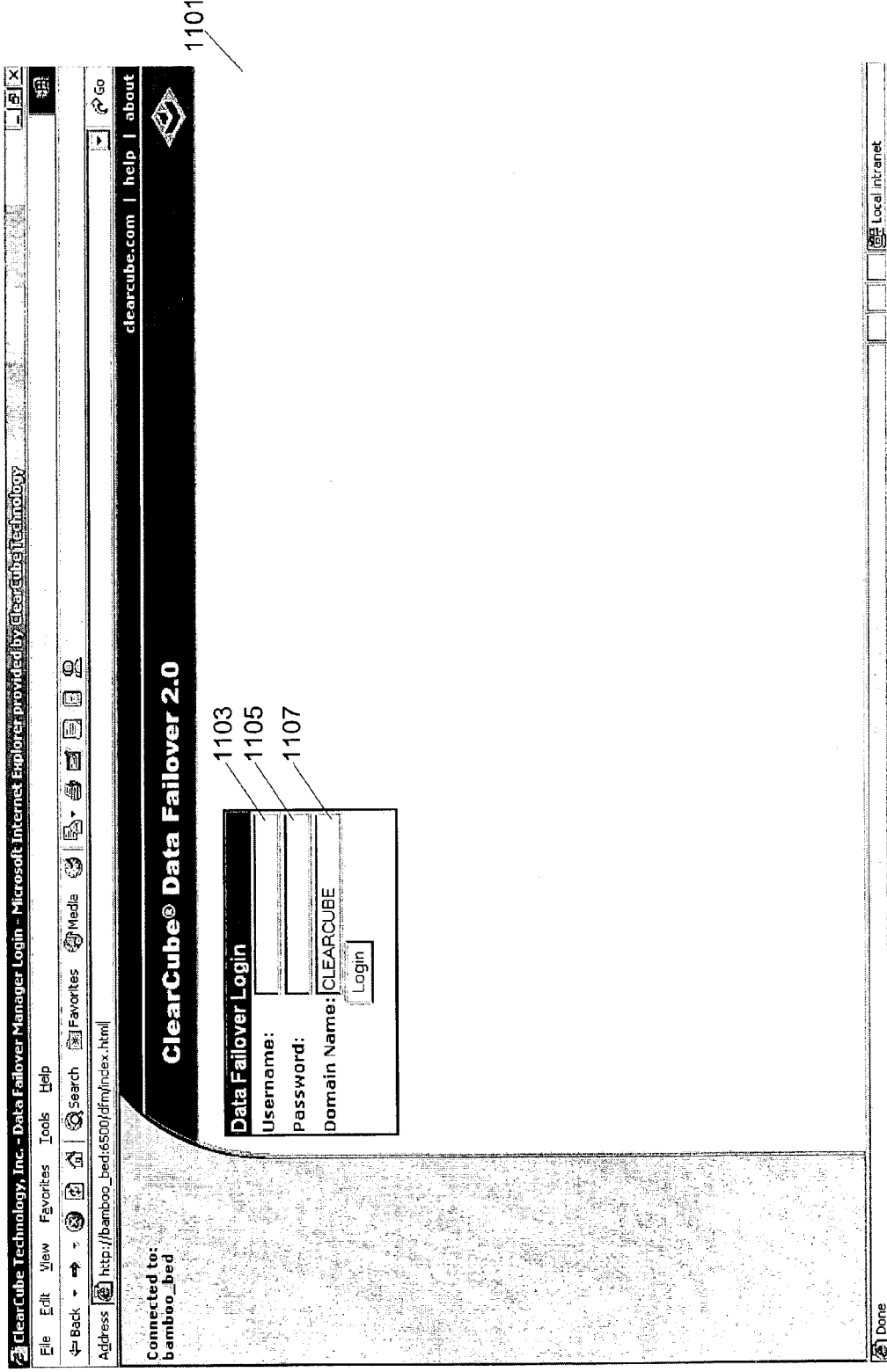
FIG. 11 illustrates a login screen of a management console, e.g., a web-based management interface, according to one embodiment.

FIG. 11—Screen Shot of a Login Screen

FIG. 11 illustrates an embodiment of a login screen 1101 of a management console, e.g., a web-based management interface. In one embodiment, the resource manager may provide a graphical user interface operable to display information related to collecting data and analyzing said collected data. In one embodiment, the graphical user interface may also receive user input related to performing one or more resource management operations. For example, a login screen 1101 may appear before a management session is started. In one embodiment, to enter the management console, a user may need domain administration rights. A login may be validated through a primary domain controller. A username 1103 and password 1105 may be registered with a network to validate users on the management console. The user may supply a username 1103, password 1105, and a domain name 1107, although other user inputs are also contemplated. Once the username 1103, password 1105, and domain name 1107 are authenticated, the user may be automatically redirected to a management console main menu or screen.

Figure 12:
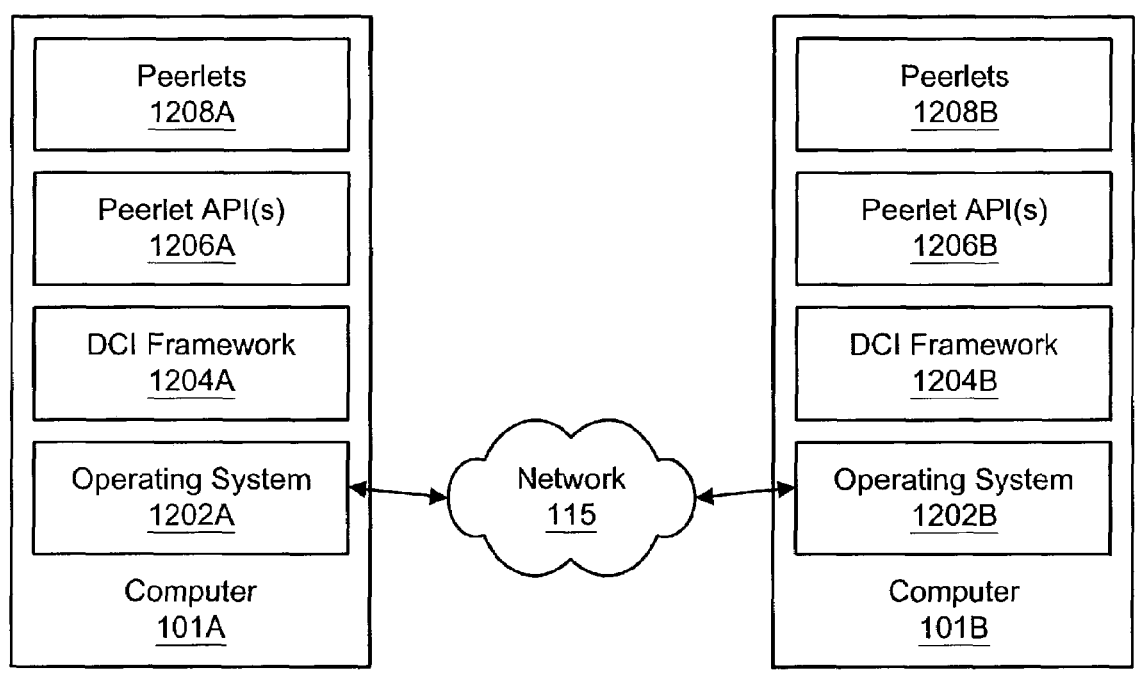
FIG. 12 is a block diagram illustrating a DCI architecture, according to one embodiment.
Figure 13:
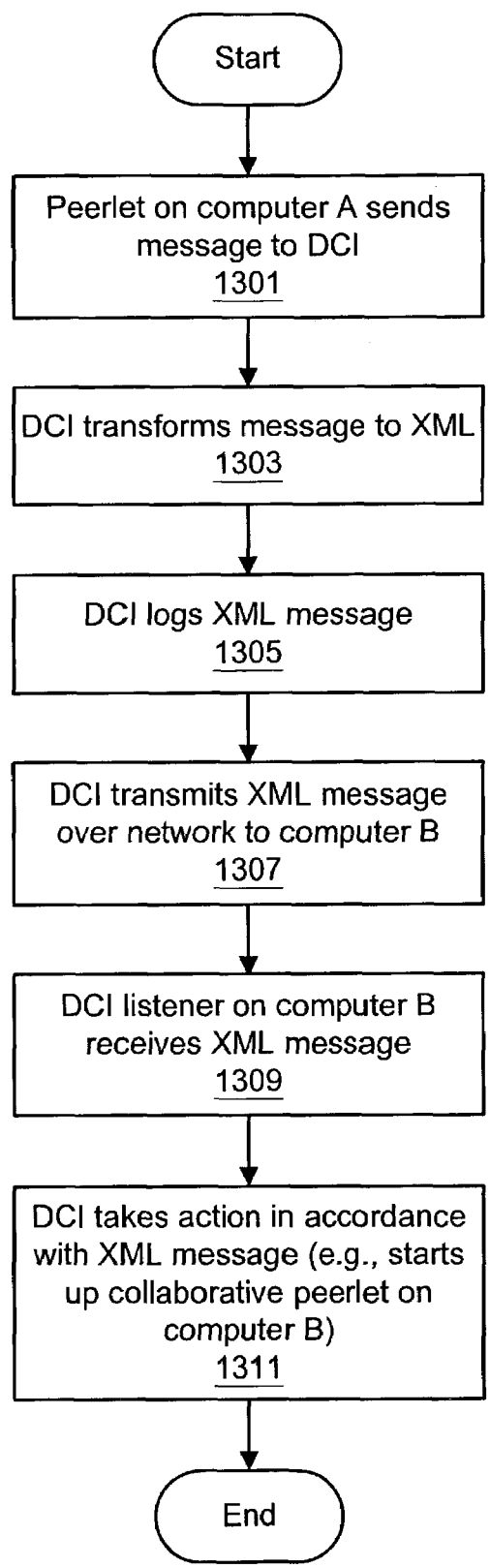
FIG. 13 is a flowchart illustrating a method for using DCI, according to one embodiment.

FIGS. 12-13—Distributed Computing Infrastructure

FIG. 12 is a block diagram illustrating a DCI architecture according to one embodiment. Each of two or more computer blades 101 (A and B, in this example) runs an operating system (OS) 1202. In one embodiment, the OS 1202 handles basic tasks like networking over TCP/IP. Each DCI-enabled computer system on the network 115 may include a DCI stack. The DCI stack may include the core DCI framework 1204, one or more peerlet APIs 1206, and one or more peerlets 1208.

Peerlets 1208 are applications that provide functions on DCI-enabled computers. For example, chat, whiteboard, and other collaborative applications may be implemented as peerlets that can take advantage of DCI. In some cases, peerlets can implement functionality themselves. Peerlets may also be "shells" that are used to invoke functionality provided by other pieces of software. Specific peerlet APIs (Application Programming Interfaces) 1206 provide an interface between the core DCI framework 1204 and specific peerlets. In one embodiment, peerlets are not network-aware but rather pass requests for network activity to the DCI framework 1204.

DCI may enable applications that were not originally designed for distributed computing to be executed in a distributed manner. For example, DCI may utilize an existing web browser without new integration code in the following manner. A user may request the retrieval of a web page from a remote web server (e.g., a news story from a news website), the combination of that web page with locally generated data (e.g., editorial comments from the user on the news story), and the storage of the combination on a database server. Using DCI, the user computer A may unicast a message to a web browser program on computer B to retrieve the web page. The output may be returned to computer A. Computer A may then combine the news story with the editorial comments in an XML message. This message may then be unicast to a command-line database program on computer C for storage in a database.

In one embodiment, DCI uses peer-to-peer message passing with no intermediary server. FIG. 13 is a flowchart illustrating a method for DCI message-passing according to one embodiment. In 1301, a peerlet on computer A generates a message to be sent to computer B. For example, a user may instruct a chat peerlet on computer A to request a chat session with a user on computer B or send a chat message in an ongoing, active chat session to a user on computer B. Generally, messages may include text and/or other data and metadata as well as requests to invoke the functionality of an application on another DCI-enabled computer.

In 1303, the DCI framework may transform the message to an XML (eXtensible Markup Language) format. The XML message may include the "payload" (i.e., the actual message to be delivered to the user on computer B) as well as a plurality of metadata elements. The metadata elements may include, for example, the type of application that send the message, the GUID (globally unique ID) of the instance of the application, and the sender.

In 1305, the DCI framework may log the XML message. In one embodiment, all tasks that have been reduced to XML messages may be logged to a message queue in archivable form. The XML messages in the queue may be sorted by application type, sender, receiver, etc. Activities may be replayed through the use of the logged XML messages.

In 1307, the XML message may be sent over the network from computer A to computer B. The XML metadata may include a TTL value indicating the total number of allowable "hops" before the message is considered undeliverable. This value is decremented with each network hop; when the value reaches zero, DCI may consider the message to be expired. To prevent denial-of-service attacks, a value in excess of a maximum value (e.g., 9) may be reset to that maximum value.

In 1309, a DCI "listener" in the core DCI framework on computer B may receive the XML message. In one embodiment, the DCI listener may utilize a UDP server to listen for incoming packets over an IP-based network connection. The use of UDP rather than TCP may allow for the rapid shipment of packets without the overhead of TCP. The UDP server may be multi-threaded for increased scalability and improved response time. In one embodiment, the actual communication between DCI-enabled computers may use a more reliable mechanism such as TCP.

In 1311, DCI may process the message, for example, to deliver its payload and/or invoke the requested functionality. In one embodiment, the DCI framework 1204B may determine the type of application that sent the incoming message using the XML metadata. If there is no application currently executing on computer B that can receive the message, the DCI framework 1204B may invoke an instance of the relevant application (e.g., a peerlet 1208B) on computer B. In one embodiment, DCI 1204B may queue the incoming message until the relevant application has started up. DCI 1204B may then transmit the queued message to the application.

Various embodiments may further include receiving or storing instructions and/or information implemented in accordance with the foregoing description upon a carrier medium. Suitable carrier media may include storage media or memory media such as magnetic or optical media, e.g., disk or CD-ROM, as well as transmission media or signals such as electrical, electromagnetic, or digital signals, conveyed via a communication medium such as a network and/or a wireless link Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system for managing resources for a plurality of networked computers, the system comprising:
   a plurality of computers coupled to a network, wherein each of the plurality of computers comprises a processor and a memory medium coupled to the processor, wherein each one of the plurality of computers further comprises one or more resources;
   a distributed resource manager distributed on two or more first computers of the plurality of computers, wherein the memory medium on at least two or more first computers contains instructions to execute at least a portion of the distributed resource manager, wherein the distributed resource manager is operable to:
   collect data from one or more second computers of the plurality of computers; and
   analyze the data to determine allocation of one or more resource management operations for the one or more second computers, wherein said analyzing operates to produce one or more determined resource management operations.

2. The system of claim 1,
   wherein at least two first computers perform said analyzing concurrently.

3. The system of claim 2, wherein said performing said analyzing concurrently comprises:
   broadcasting the one or more determined resource management operations;
   receiving respective one or more determined resource management operations from the two or more first computers; and
   resolving conflicts between said one or more determined resource management operations and said received respective one or more determined resource management operations, thereby generating a modified one or more resource management operations.

4. The system of claim 3, wherein said resolving conflicts comprises using one or more of:
   a first in time prioritization;
   a rule based prioritization; or
   an averaged decision prioritization.

5. The system of claim 1, wherein the distributed resource manager is further operable to:
   perform the one or more determined resource management operations for the one or more second computers.

6. The system of claim 5,
   wherein the distributed resource manager is operable to perform the one or more determined resource management operations automatically.

7. The system of claim 5,
   wherein the distributed resource manager is operable to perform the one or more determined resource management operations in response to user input, wherein the one or more determined resource management operations are presented to the user, wherein the distributed resource manager performs one or more user-selected resource management operations in response to the user input selecting the one or more user-selected resource management operations from the one or more determined resource management operations.

8. The system of claim 1,
   wherein said collecting data related to one or more of the plurality of computers comprises a collector agent executing on one or more computers providing said data for said analysis.

9. The system of claim 8, wherein said providing the data for said analysis comprises the data collector agent sending the data to a database; and
   wherein said analysis comprises retrieving the data from the database for said analyzing.

10. The system of claim 1,
    wherein the one or more determined resources management operations are broadcast to the second computers on the network.

11. The system of claim 1, wherein one or more of the plurality of computers is operable to perform an auto-discovery process to determine presence of at least a subset of the plurality of computers.

12. The system of claim 1, wherein the data comprises one or more of usage, performance, status, and load, for a component, process, and/or attribute of said one or more computers.

13. The system of claim 1, wherein said analyzing the data to determine one or more resource management operations for the plurality of second computers comprises:
    evaluating one or more operation rules using the data to determine the one or more resource management operations for the plurality of second computers, wherein each operation rule specifies conditions for a resource management operation of the one or more resource management operations.

14. The system of claim 1, wherein the one or more resource management operations comprises one or more of:
    a single computer switch;
    a computer swap;
    a cascading move;
    a configuration one or more computers of the plurality of computers;
    a backup of a storage medium for said one or more computers;
    an activation or deactivation of said one or more computers;
    a storage operation;
    an execution or termination of a program; or
    a transmission of a message related to usage, performance, status, and load, for a component, process, and/or attribute of said one or more computers.

15. A method for managing resources for a plurality of computers coupled to a network, wherein each of the plurality of computers comprises a processor, a memory medium coupled to the processor, and one or more resources, the method comprising:
    a distributed resource manager distributed on two or more first computers of the plurality of computers collecting data from one or more second computers of the plurality of computers; and
    the distributed resource manager analyzing the data to determine allocation of one or more resource management operations for the one or more second computers, wherein said analyzing operates to produce one or more determined resource management operations.

16. The method of claim 15, wherein said distributed resource manager distributed on two or more first computers analyzing the data comprises at least two first computers performing said analyzing concurrently.

17. The method of claim 16, wherein said performing said analyzing concurrently comprises:
broadcasting the one or more determined resource management operations;
receiving respective one or more determined resource management operations from the two or more first computers; and
resolving conflicts between said one or more determined resource management operations and said received respective one or more determined resource management operations, thereby generating a modified one or more resource management operations.

18. The method of claim 17, wherein said resolving conflicts comprises using one or more of:
a first in time prioritization;
a rule based prioritization; or
an averaged decision prioritization.

19. The method of claim 15, further comprising:
the distributed resource manager performing the one or more determined resource management operations for the one or more second computers.

20. The method of claim 19,
wherein said performing the one or more determined resource management operations is performed automatically.

21. The method of claim 19, wherein said performing the one or more determined resource management operations is performed in response to user input, wherein said performing comprises:
presenting the one or more determined resource management operations to the user; and
performing one or more user-selected resource management operations in response to the user input selecting the one or more user-selected resource management operations from the one or more determined resource management operations.

22. The method of claim 15, wherein said collecting data related to one or more of the plurality of computers comprises a collector agent executing on one or more computers providing said data for said analyzing.

23. The method of claim 22,
wherein said providing the data for said analyzing comprises the data collector agent sending the data to a database; and
wherein said analyzing comprises retrieving the data from the database for said analyzing.

24. The method of claim 15,
wherein said analyzing is performed by a first and a second of the one or more of the second computers to produce a first and a second decision respectively, wherein each decision indicates one or more resource management operations.

25. The method of claim 24, further comprising:
the distributed resource manager resolving a conflict based on pre-defined rules, wherein the conflict exists if the first decision is different from the second decision.

26. The method of claim 15, further comprising:
the distributed resource manager broadcasting the one or more determined resources management operations to the second computers on the network.

27. The method of claim 15, further comprising:
one or more of the plurality of computers performing an auto-discovery process to determine presence of at least a subset of the plurality of computers.

28. The method of claim 15, wherein the data comprises one or more of: usage, performance, status, and load, for a component, process, and/or attribute of said one or more computers.

29. The method of claim 15, wherein said analyzing the data to determine one or more resource management operations for the plurality of second computers comprises:
evaluating one or more operation rules using the data to determine the one or more resource management operations for the plurality of second computers, wherein each operation rule specifies conditions for a resource management operation of the one or more resource management operations.

30. The method of claim 15, wherein the one or more resource management operations comprises one or more of:
a single computer switch;
a computer swap;
a cascading move;
a configuration one or more computers of the plurality of computers;
a backup of a storage medium for said one or more computers;
an activation or deactivation of said one or more computers;
a storage operation;
an execution or termination of a program; or
a transmission of a message related to usage, performance, status, and load, for a component, process, and/or attribute of said one or more computers.

31. The method of claim 15,
wherein the one or more first computers and the one or more second computers comprise one or more computers in common.

32. A system for managing resources for a plurality of networked computer systems, the system comprising:
a plurality of computers coupled to a network, wherein each computer comprises:
a processor; and
a memory medium coupled to the processor;
wherein the memory medium of each computer of the plurality of computers stores program instructions which are executable by the processor of said each computer to:
collect data related to one or more first computers of the plurality of computers; and
analyze said data to determine one or more resource management operations for said one or more first computers, wherein said analyzing is performed by a distributed resource manager;
wherein said analyzing is performed by two or more second computers of the plurality of computers, wherein each of the two or more second computers form a portion of the distributed resource manager.

33. The system of claim 32,
wherein said analyzing is performed by a first and a second of the one or more of the second computers to produce a first and a second decision respectively, wherein each decision indicates one or more resource management operations.

34. The system of claim 33, wherein the distributed resource manager is further operable to:
resolve a conflict based on pre-defined rules, wherein the conflict exists if the first decision is different from the second decision.

35. The system of claim 32,
wherein the one or more first computers and the one or more second computers comprise one or more computers in common.

36. The system of claim 32,
wherein more than one computer of the second computers concurrently analyzes and processes said data.

* * * * *